United States Patent
Frid et al.

(10) Patent No.: US 10,459,636 B2
(45) Date of Patent: Oct. 29, 2019

(54) SYSTEM AND METHOD FOR MANAGING DATA IN NON-VOLATILE MEMORY SYSTEMS HAVING MULTIPLE MAPPING LAYERS

(71) Applicant: SanDisk Technologies LLC, Plano, TX (US)

(72) Inventors: Marina Frid, Jerusalem (IL); Igor Genshaft, Bat Yam (IL)

(73) Assignee: SanDisk Technologies LLC, Plano, TX (US)

( * ) Notice: Subject to any disclaimer, the term of this patent is extended or adjusted under 35 U.S.C. 154(b) by 224 days.

(21) Appl. No.: 15/468,801

(22) Filed: Mar. 24, 2017

(65) Prior Publication Data

US 2018/0275873 A1    Sep. 27, 2018

(51) Int. Cl.
  *G06F 3/06* (2006.01)
  *G06F 12/02* (2006.01)

(52) U.S. Cl.
  CPC .............. *G06F 3/061* (2013.01); *G06F 3/064* (2013.01); *G06F 3/0655* (2013.01); *G06F 3/0679* (2013.01); *G06F 3/0688* (2013.01); *G06F 12/0246* (2013.01); *G06F 2212/1016* (2013.01); *G06F 2212/1041* (2013.01); *G06F 2212/7201* (2013.01); *G06F 2212/7205* (2013.01)

(58) Field of Classification Search
  CPC ...... G06F 3/061; G06F 3/0655; G06F 3/0679; G06F 12/0246; G06F 12/0875; G06F 2212/452; G06F 2212/7201
  USPC ......................................................... 711/103
  See application file for complete search history.

(56) References Cited

U.S. PATENT DOCUMENTS

| 7,133,971 B2 * | 11/2006 | Matick ................. G06F 12/122 711/134 |
| 8,954,656 B2 | 2/2015 | Thomas |
| 8,954,694 B2 * | 2/2015 | Tomlin ................ G06F 12/0246 711/162 |
| 9,383,927 B2 | 7/2016 | Thomas |

(Continued)

OTHER PUBLICATIONS

Unknown, "3D NAND and UFS for Mobile", Aug. 9, 2016, Micron Technology, Inc. (Year: 2016).*

(Continued)

*Primary Examiner* — Reginald G Bragdon
*Assistant Examiner* — Aaron D Ho
(74) *Attorney, Agent, or Firm* — Dickinson Wright PLLC

(57) ABSTRACT

A system and method is described for managing mapping data in a non-volatile memory system having a volatile memory cache smaller than the update table for the mapping data. The system includes multiple mapping layers, for example two mapping layers, including a master mapping table of logical-to-physical mapping entries and an update table of mapping updates, for a non-volatile memory. A processor swaps predetermined size portions of the update mapping table and master mapping table into and out of the volatile memory cache based on host workload. The update mapping table portions may have a fixed or an adaptive logical range. Additional mapping layers, such as an expanded mapping layer having portions with a logical range greater than the logical range of the update mapping portions, may also be included and may be swapped into and out of the volatile memory with the master and update mapping table portions.

21 Claims, 15 Drawing Sheets

(56) References Cited

U.S. PATENT DOCUMENTS

| | | | |
|---|---|---|---|
| 2009/0113121 A1* | 4/2009 | Lee ................. | G06F 12/0246 |
| | | | 711/103 |
| 2013/0124794 A1* | 5/2013 | Bux ................. | G06F 12/0246 |
| | | | 711/103 |
| 2015/0347026 A1* | 12/2015 | Thomas .............. | G06F 3/0611 |
| | | | 711/103 |
| 2016/0246726 A1* | 8/2016 | Hahn ................ | G06F 12/0862 |

OTHER PUBLICATIONS

Yi Ou and Theo Härder. 2010. "Clean first or dirty first?: a cost-aware self-adaptive buffer replacement policy". In Proceedings of the Fourteenth International Database Engineering & Applications Symposium (IDEAS '10). ACM, New York, NY, USA, 7-14. (Year : 2010).*

* cited by examiner

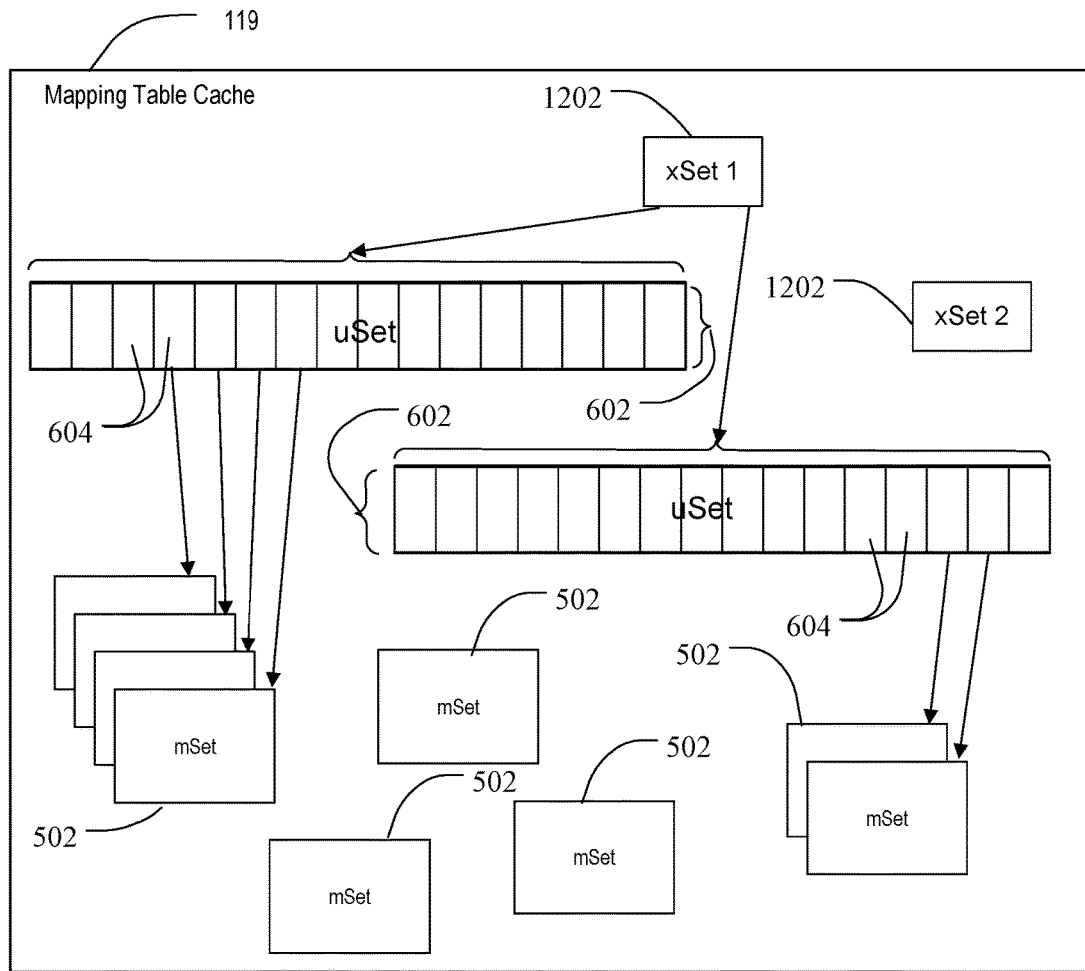
FIG. 15
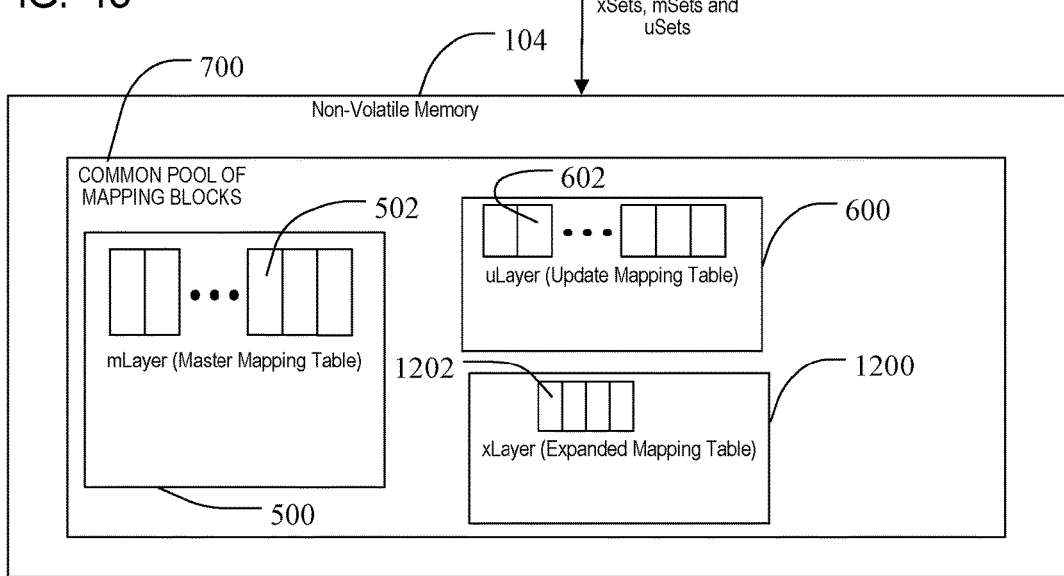

SYSTEM AND METHOD FOR MANAGING DATA IN NON-VOLATILE MEMORY SYSTEMS HAVING MULTIPLE MAPPING LAYERS

BACKGROUND

Non-volatile memory systems, such as solid state drives (SSDs) including NAND flash memory, are commonly used in electronic systems ranging from consumer products to enterprise-level computer systems. Modern high-performance storage devices often include a volatile random access memory (RAM) cache used to store mapping tables, executable firmware code, and other data. Non-volatile memory systems use logical-to-physical (L2P) mapping and use management tables with control data for the dynamic mapping. The management tables are stored in the non-volatile memory but, in order to provide high performance management, their copies are maintained in the RAM.

BRIEF DESCRIPTION OF THE DRAWINGS

FIG. 15 is an alternative implementation of the conceptual illustration of FIG. 7 illustrating the exchange of portions of the complete master mapping layer, the complete update mapping layer and the complete expanded mapping layer maintained in non-volatile memory between the mapping table cache of the volatile memory (RAM) and non-volatile memory.

DETAILED DESCRIPTION

Figure 1A:
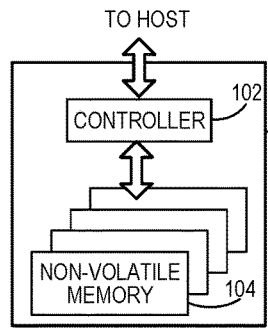
FIG. 1A is a block diagram of an example non-volatile memory system.

Modern memory devices often have a dual-layered mapping architecture for logical to physical mapping consisting of mLayer (master mapping layer) and uLayer (update mapping layer). The mLayer size is relatively big and its structure may be a regular, direct-access array. In contrast, the uLayer size may be smaller and its structure less regular. The uLayer structure is less regular than the mLayer because the mapping of the same logical block address (LBA) range can have different sizes at different times. Because of this, the mLayer can be easily divided into equal segments (also referred to herein as mSets) which can be saved to non-volatile memory, such as NAND flash, and loaded from non-volatile memory (i.e. swapped out and in) when needed. The size of a uLayer is proportional to capacity of the device. For high-end devices equipped with an amount of volatile memory, such as random access memory (RAM), proportional to the device's non-volatile memory capacity a memory system can keep the entire uLayer in RAM. However, low-RAM devices, for example devices without dynamic RAM (DRAM) may have a limited amount of space available in RAM for mapping data and thus can only hold a portion of a uLayer regardless of the device's non-volatile memory capacity.

A system and method for managing mapping data with a limited size volatile memory cache is provided. The non-volatile memory system may include a non-volatile memory, a volatile memory having a fixed-size mapping cache, and a controller in communication with the volatile memory and the non-volatile memory. The controller may be configured to store a master mapping table of logical to physical address mapping data for data in the non-volatile memory, where the master mapping table is of a predetermined size and is divided into equal size master mapping table sets. The controller may also be configured to store, in the non-volatile memory, an update mapping table of logical to physical address mapping data, the update mapping table having updated logical to physical mapping data not yet written into the master mapping table, where the update mapping table is divided into a multiple update mapping table sets each having a same physical size as a master mapping table set, wherein a size of the fixed size mapping cache of the volatile memory is less than a size of the update mapping table. Additionally the controller may be configured to swap a portion of the update mapping table sets between the non-volatile memory and the volatile memory based on a workload of the non-volatile memory system.

According to another aspect, a method of managing mapping data in a non-volatile memory system is described. The non-volatile memory system includes a non-volatile memory and a controller in communication with the non-volatile memory, where the method may include the controller receiving a host command identifying at least one logical block address (LBA) assigned to data associated with the command. The method also includes determining if mapping data associated with the at least one LBA is present in a fixed-size mapping cache in volatile memory of the non-volatile memory system, where a size of the fixed-size mapping cache of the volatile memory is less than a size of an update mapping layer in the non-volatile memory. When the mapping data associated with the at least one LBA is not present in the volatile memory mapping cache and the fixed-size volatile memory mapping cache is full, the method further comprises the controller removing an update mapping layer set currently stored in the volatile memory not associated with the at least one LBA, the update mapping layer set comprising one of a plurality of update mapping layer sets forming a complete update mapping layer stored in the non-volatile memory. The controller may then proceed with copying any valid update data from the removed update mapping layer set into non-volatile memory, and with copying into the fixed-size mapping cache from the non-volatile memory at least one of a master mapping layer set or an update mapping layer set associated with the at least one LBA. The non-volatile memory may contain a master mapping layer divided into a plurality of master mapping layer sets, each master mapping layer set containing direct mapping entries of logical-to-physical mappings for all logical addresses in a first range length of LBAs, as well as contain an update mapping layer divided into a plurality of update mapping layer sets each having mapping update entries for a second range length of LBAs.

In yet another aspect, a non-volatile memory system with more than two mapping layers may be implemented. For example, the non-volatile memory system may include a non-volatile memory having a master mapping layer divided into a plurality of master mapping sets of logical-to-physical mapping entries, an update mapping layer divided into a plurality of update mapping sets and an expanded mapping layer divided into a plurality of expanded mapping layer sets. Each master mapping set, update mapping set and expanded mapping set may have a same physical size, each update mapping set may be associated with a logical block address (LBA) range equal to a fixed plurality of master mapping set LBA ranges, and each expanded mapping set may be associated with a fixed plurality of update mapping set LBA ranges. The non-volatile memory system may also include a volatile memory mapping cache having a fixed size that is less than a size of the update mapping layer. The system may also include mapping set management means for, when mapping data for an LBA associated with a received host command is not in the volatile memory mapping cache, copying at least one master mapping set, update mapping set or expanded mapping set for an LBA associated with a received host command from the non-volatile memory to the volatile memory mapping cache when space is available in the volatile memory mapping cache for additional mapping data. Alternatively, when the volatile memory mapping cache is currently full, the mapping management means may be configured for removing at least one master mapping set, update mapping set or expanded mapping set that is currently in the volatile memory mapping cache and then copying at least one master mapping set, update mapping set or expanded mapping set corresponding to the LBA.

FIG. 1A is a block diagram illustrating a non-volatile memory system. The non-volatile memory (NVM) system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, one or more microprocessors or processors (also referred to herein as central processing units (CPUs)), and a computer-readable medium that stores computer-readable program code (e.g., software or firmware) executable by the (micro)processors, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although in the example illustrated in FIG. 1A NVM system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
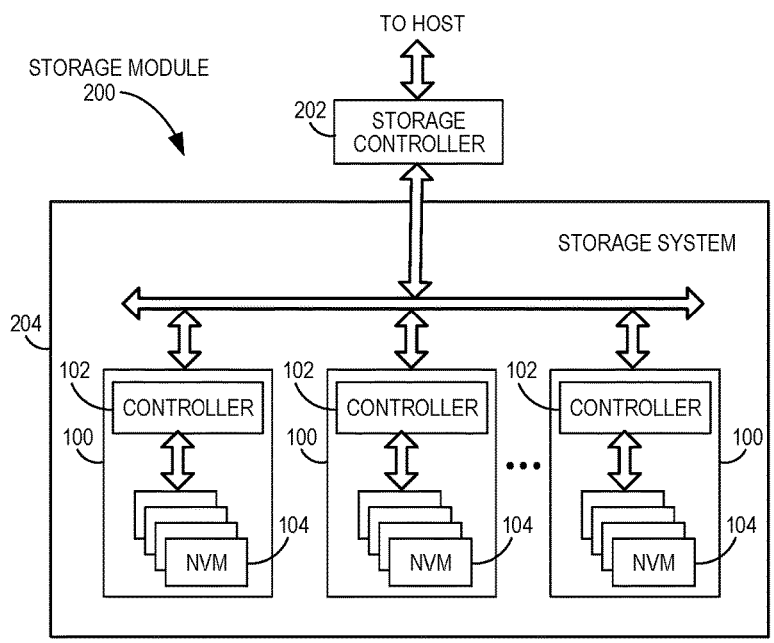
FIG. 1B is a block diagram illustrating an exemplary storage module.

FIG. 1B illustrates a storage module 200 that includes plural NVM systems 100. As such, storage module 200 may include a storage controller 202 that interfaces with a host and with storage system 204, which includes a plurality of NVM systems 100. The interface between storage controller 202 and NVM systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
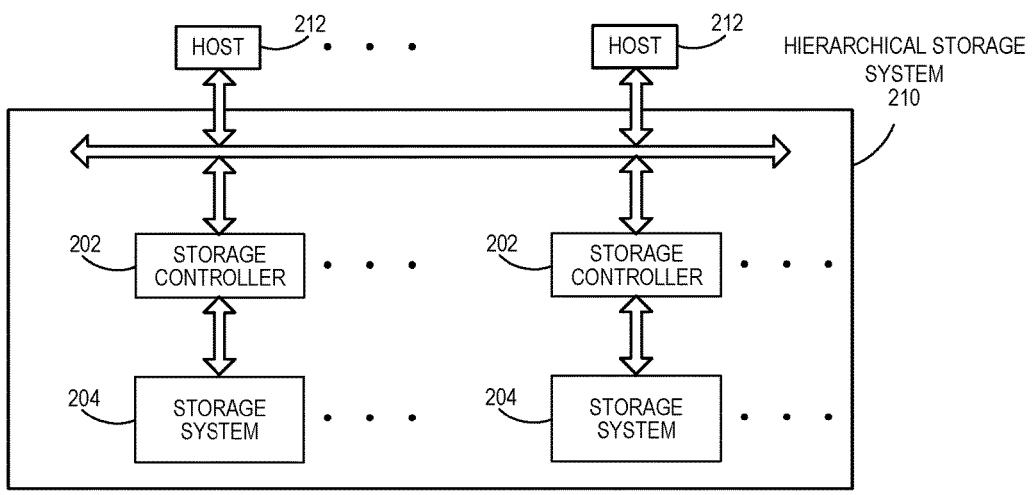
FIG. 1C is a block diagram illustrating a hierarchical storage system.

FIG. 1C is a block diagram illustrating a hierarchical storage system. A hierarchical storage system 210 includes a plurality of storage controllers 202, each of which controls a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
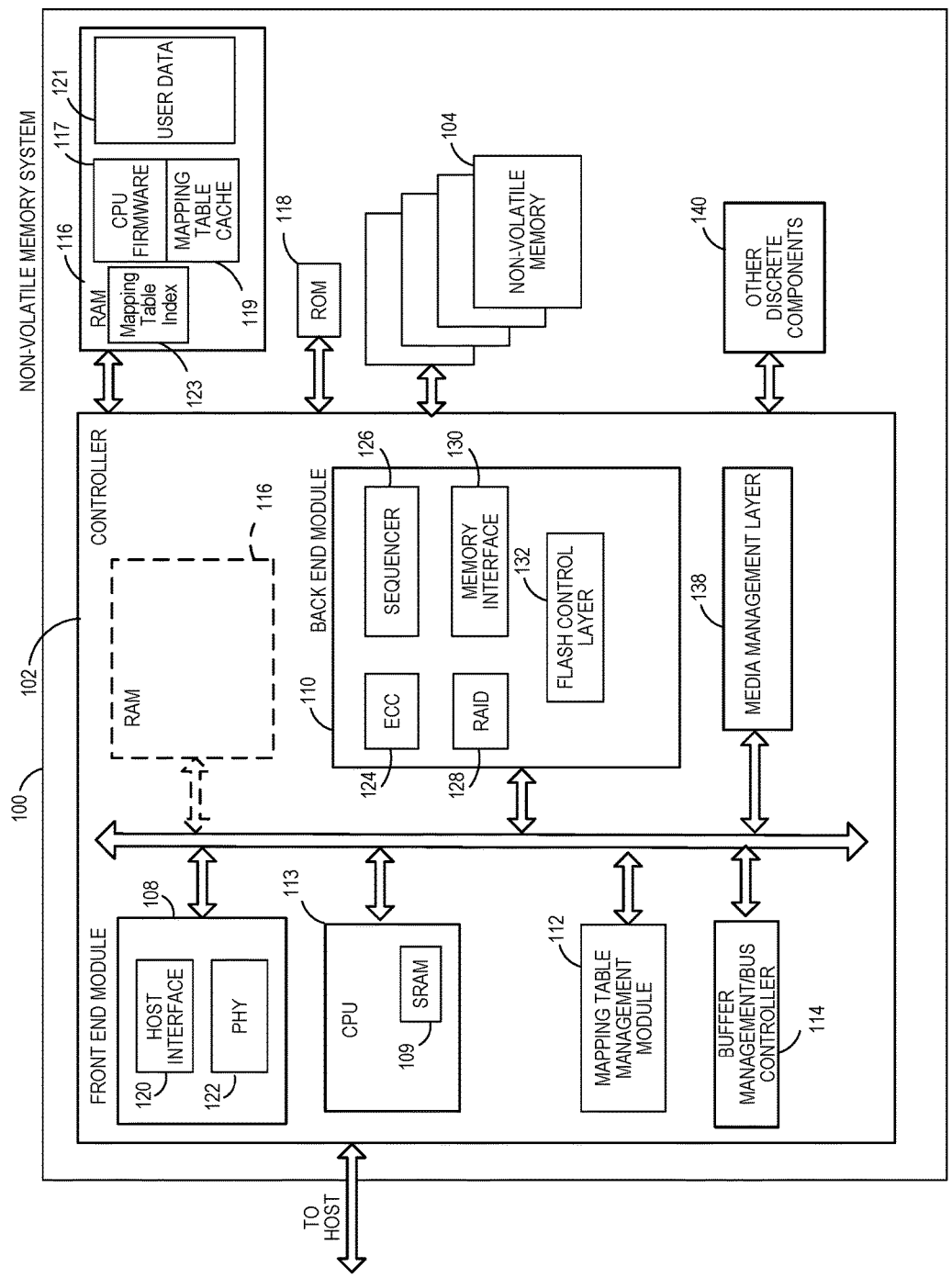
FIG. 2A is a block diagram illustrating exemplary components of a multi-processor controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. In one embodiment, one or more hardware processors, one example of which is central processing unit (CPU) 113, may be part of or assigned to the front end module 108, the back end module 110 and the media management layer 138 (also referred to as the flash translation layer).

Modules of the controller 102 may include a mapping table management module 112 to provide functionality for managing the selection, update and swapping out from RAM 116 different pieces of mapping table data. For example, the mapping table correction module 112 may select certain portions of the master mapping table and the update mapping table for moving into or out of the limited portion of RAM 116, referred to herein as the mapping table cache 119, allocated for holding mapping information.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller. Further, in some implementations, the controller 102, RAM 116, and ROM 118 may be located on separate semiconductor die.

The RAM 116 may be dynamic random access memory (DRAM) and be used as a cache for various types of data. As described in greater detail below, the RAM 116 in the NVM system 100, whether outside the controller 102, inside the controller or present both outside and inside the controller 102, may include a portion having a copy of the processor executable instructions, also referred to herein as firmware 117, for the one or more processors in the controller 102. The RAM 116 may include a fixed-size mapping table cache 119 allocated for holding mapping table data. In some embodiments, it is contemplated that the fixed-size mapping table cache is sized to hold less than all of the update mapping table data for the logical address space managed by the NVM system 100. A mapping table index 123 may contain mapping of the copies of the pieces of the mapping table data currently in the mapping table cache 119 to the corresponding piece of mapping table data in non-volatile memory 104.

Additionally, RAM 116 may include a user data portion 121 assigned to receive user data from the host or the non-volatile memory 104. The original version of the CPU firmware 117 may be stored in the non-volatile memory 104 and when the NVM system 100 is connected to a host, the CPU firmware 117 may be written to RAM 116. Similarly, the selected portions of main mapping table data and update mapping table data may be retrieved from the complete main mapping table and complete update mapping table maintained in non-volatile memory 104 and stored in the mapping table cache 119 of RAM 116 as needed. As described below, in low RAM NVM systems, the amount of RAM available or set aside for mapping table data may limited to a predetermined amount that is less than the complete update mapping table size, such that only portions of the update mapping table can be held in RAM 116 at any one time and only portions of the main mapping table may be stored in the limited mapping table cache 119 of RAM 116.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the NVM system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of NVM system 100 illustrated in FIG. 2A include the media management layer 138, which performs wear leveling of memory cells of non-volatile memory die 104 and manages mapping tables and logical-to-physical mapping or reading tasks. NVM system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
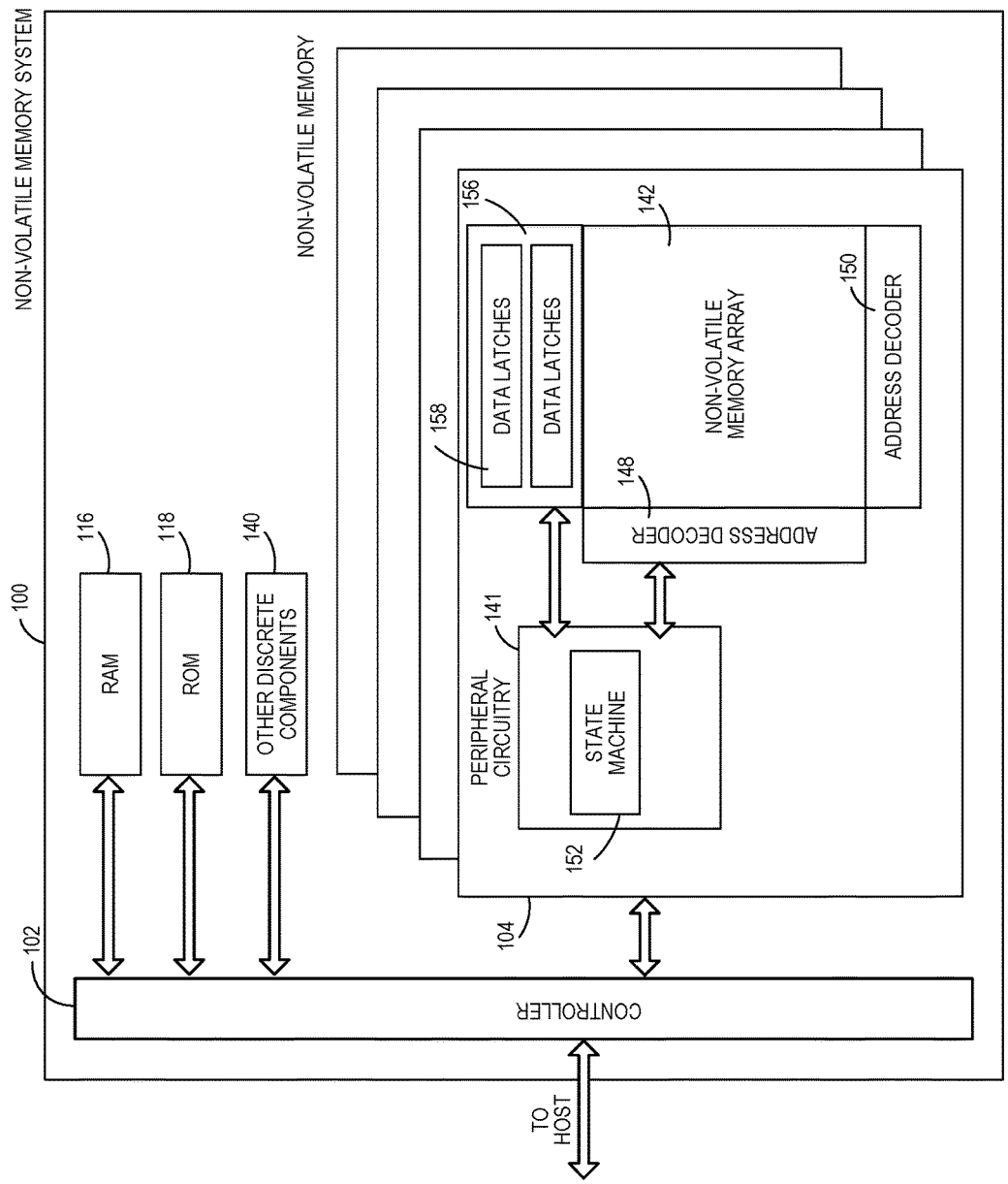
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or a three dimensional configuration. As an example of the arrangement of the non-volatile memory cells, the memory cells may be arranged in minimum units of erase referred to as blocks, where each block is composed of a predetermined number of pages and each page is composed of a predetermined number of bits. Peripheral circuitry 141 includes a state machine 152 that provides status information to controller 102. Non-volatile memory die 104 further includes a data cache 156 that caches data being read from or programmed into the non-volatile memory cells of the non-volatile memory array 142. The data cache 156 comprises sets of data latches 158 for each bit of data in a memory page of the non-volatile memory array 142. Thus, each set of data latches 158 may be a page in width and a plurality of sets of data latches 158 may be included in the data cache 156. For example, for a non-volatile memory array 142 arranged to store n bits per page, each set of data latches 158 may include n data latches where each data latch can store 1 bit of data.

In one implementation, an individual data latch may be a circuit that has two stable states and can store 1 bit of data, such as a set/reset, or SR, latch constructed from NAND gates. The data latches 158 may function as a type of volatile memory that only retains data while powered on. Any of a number of known types of data latch circuits may be used for the data latches in each set of data latches 158. Each non-volatile memory die 104 may have its own sets of data latches 158 and a non-volatile memory array 142. Peripheral circuitry 141 includes a state machine 152 that provides status information to controller 102. Peripheral circuitry 141 may also include additional input/output circuitry that may be used by the controller 102 to transfer data to and from the latches 158, as well as an array of sense modules operating in parallel to sense the current in each non-volatile memory cell of a page of memory cells in the non-volatile memory array 142. Each sense module may include a sense amplifier to detect whether a conduction current of a memory cell in communication with a respective sense module is above or below a reference level.

Figure 3:
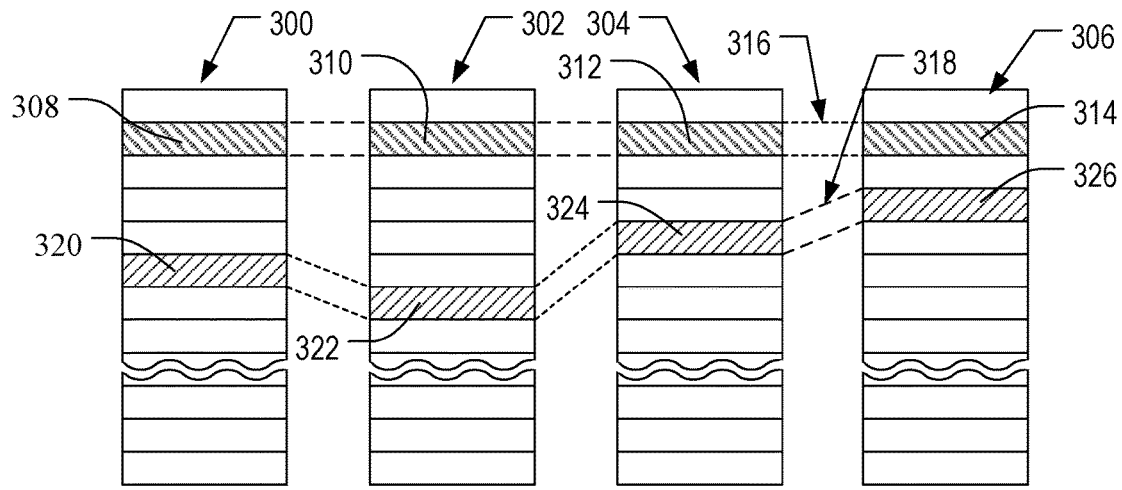
FIG. 3 illustrates an example physical memory organization of the non-volatile memory system of FIG. 1A.

The non-volatile flash memory array 142 in the non-volatile memory 104 may be arranged in blocks of memory cells. A block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. Referring to FIG. 3, a conceptual illustration of a representative flash memory cell array is shown. Four planes or sub-arrays 300, 302, 304 and 306 of memory cells may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 3 by rectangles, such as blocks 308, 310, 312 and 314, located in respective planes 300, 302, 304 and 306. There may be dozens or hundreds of blocks in each plane. Blocks may be logically linked together to form a metablock that may be erased as a single unit. For example, blocks 308, 310, 312 and 314 may form a first metablock 316. The blocks used to form a metablock need not be restricted to the same relative locations within their respective planes, as is shown in the second metablock 318 made up of blocks 320, 322, 324 and 326.

Figure 4:
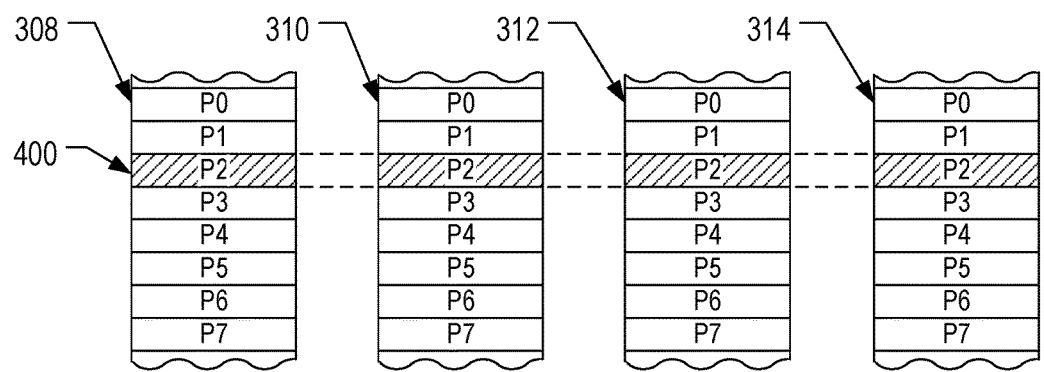
FIG. 4 shows an expanded view of a portion of the physical memory of FIG. 3.

The individual blocks are in turn divided for operational purposes into pages of memory cells, as illustrated in FIG. 4. The memory cells of each of blocks 308, 310, 312 and 314, for example, are each divided into eight pages P0-P7. Alternately, there may be 16, 32 or more pages of memory cells within each block. A page is the unit of data programming within a block, containing the minimum amount of data that are programmed at one time. The minimum unit of data that can be read at one time may be less than a page. A metapage 400 is illustrated in FIG. 4 as formed of one physical page for each of the four blocks 308, 310, 312 and 314. The metapage 400 includes the page P2 in each of the four blocks but the pages of a metapage need not necessarily have the same relative position within each of the blocks. A metapage is typically the maximum unit of programming, although larger groupings may be programmed. The blocks disclosed in FIGS. 3-4 are referred to herein as physical blocks because they relate to groups of physical memory cells as discussed above. As used herein, a logical block is a virtual unit of address space defined to have the same size as a physical block. Each logical block may include a range of logical block addresses (LBAs) that are associated with data received from a host. The LBAs are then mapped to one or more physical blocks in the non-volatile memory system 100 where the data is physically stored.

Figure 5:
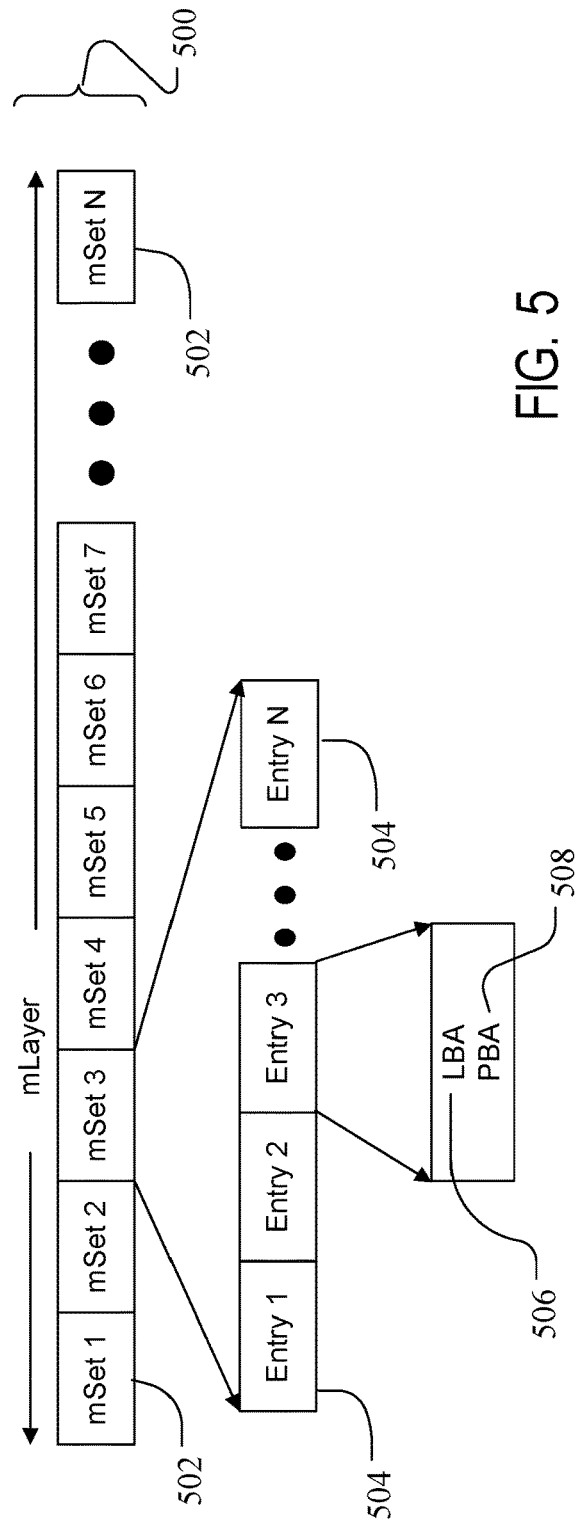
FIG. 5 illustrates a master mapping layer (mLayer) of logical-to-physical addresses for the non-volatile memory system.

Referring to FIG. 5, a complete copy of the master mapping layer, or mLayer 500 for the NVM system 100 is stored in non-volatile memory 104. The mLayer 500 is a fixed size and is broken up into uniform size portions, or mSets 502, that each cover a predetermined amount of the logical block address (LBA) range of the LBA address space managed by the NVM system 100. Each mSet 502 includes a separate entry 504 for each LBA in the mSet, where each entry 504 includes a LBA 506 and a corresponding physical block address (PBA) 508 that particular LBA 506 is mapped to in the non-volatile memory 104.

Figure 6:
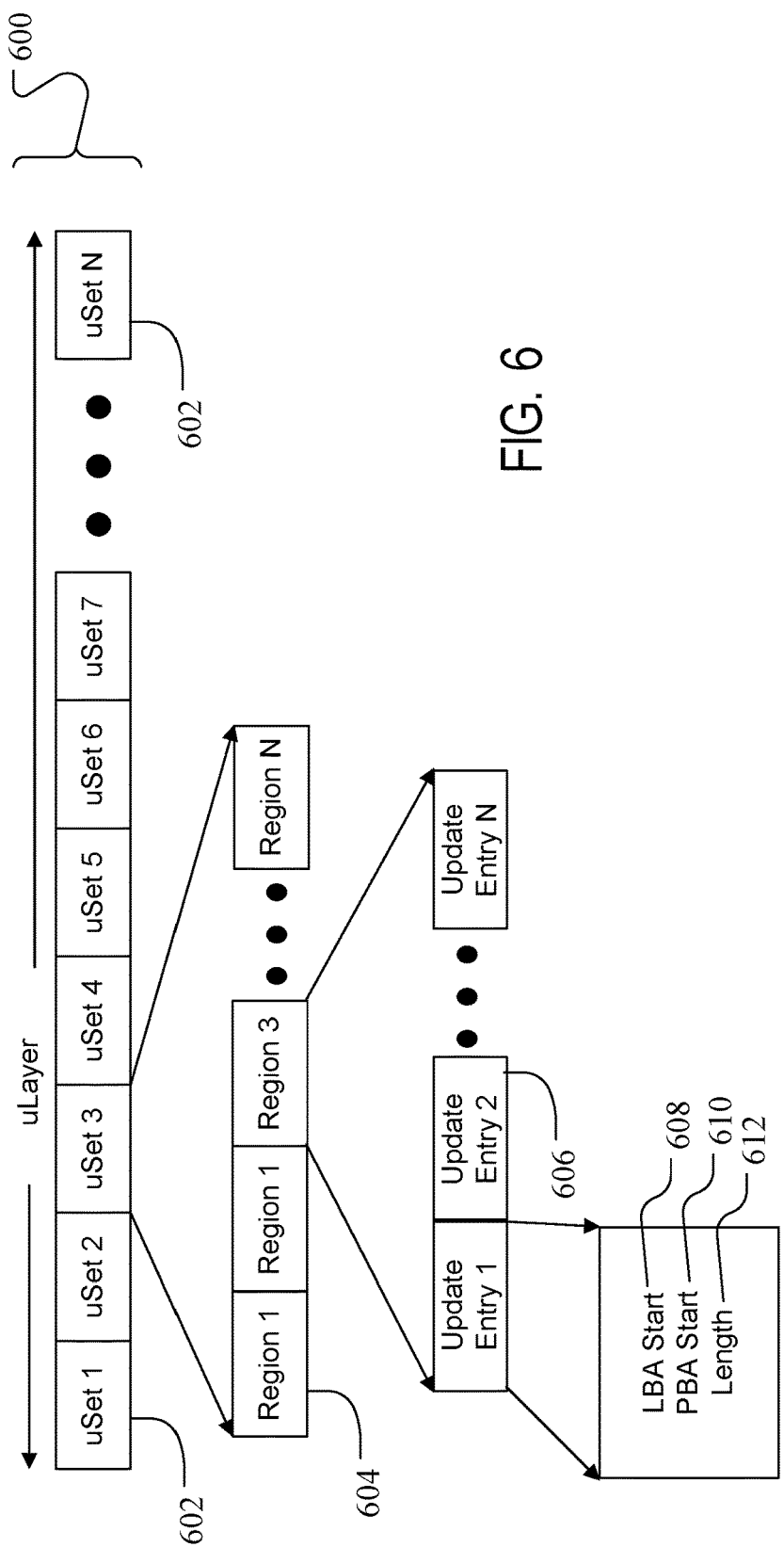
FIG. 6 illustrates an update mapping layer (uLayer) of updates to logical-to-physical addresses for the non-volatile memory system.

Referring to FIG. 6, the non-volatile memory 104 also stores the update mapping table, or uLayer 600. The uLayer 600 is a mapping structure is smaller in size than the mLayer 500 and its structure is less regular than the mLayer 500 in that the mapping of the same LBA range can have a different size at different times for the uLayer 600. The uLayer 600 is divided into uniform size portions, or uSets 602, that each include a fixed number of regions 604. Each of the fixed regions 604 includes a fixed number of update entries 606, where each update entry may include a LBA starting address 608, a PBA starting address 610 and a data length 512 for the run of data starting at the LBA and PBA starting addresses 608, 610. In one implementation, each region 604 of a uSet 602 covers the same LBA range length as one mSet 502 and so each uSet 602 encompasses the LBA range of multiple mSets 502.

Each uSet 602 is created to have a same physical size as an mSet 502 in one implementation, such that the number update entries 606 assigned to a region 604 are limited. Thus, although a region 604 in a uSet 602 corresponds to an LBA range of a particular mSet 502, the limited number of update entries 606 in each region 604 means that there is only enough room in each region to hold N update entries for the associated LBA range. When all the limited number of update entries 606 for a particular region 604 have been filled due to write activity since the last mLayer update, the presently stored mapping updates in the that uSet 602 are consolidated with the multiple mSets corresponding to the regions 604 to empty out the latest updates from the update entries 604 into the mLayer so that the uSet 602 is again available for more address updates.

A useful feature of the uSets is that, because each uSet 602 covers more LBAs than an mSet 502, the amount of write amplification may be reduced in certain circumstances. Having the ability to update mapping table entries over a wider range available with uSets may be beneficial, rather than swapping in and out mSets from the RAM 116 when the workload is a wide workload, where data writes to the NVM system 100 are over a wide range of different LBAs that would otherwise require multiple reads and writes from the small portion of the mSets 502 (and the corresponding limited LBA range associated with those limited number of mSets 502) that can fit into the volatile memory cache in RAM 116.

Figure 7:
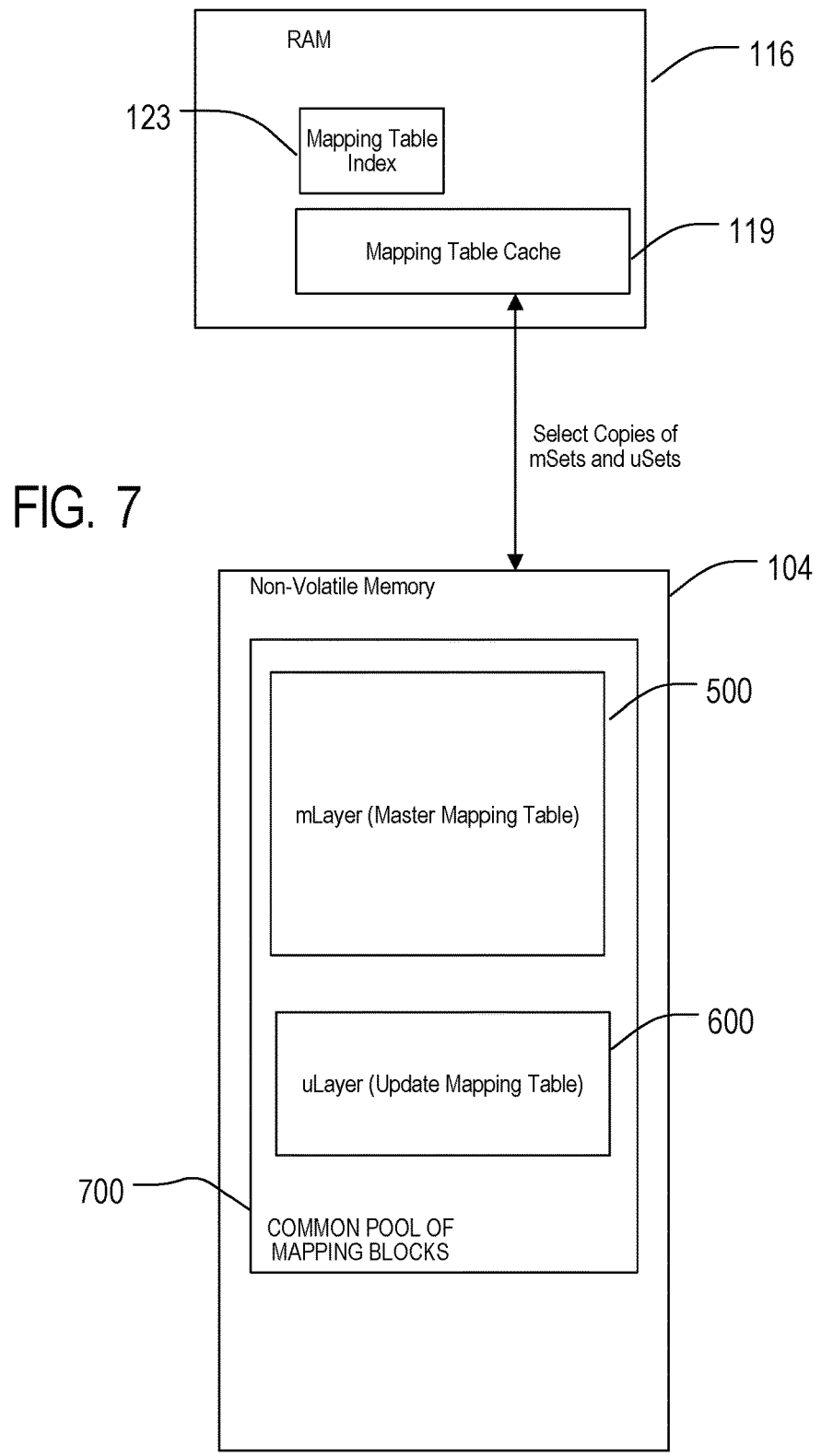
FIG. 7 is a conceptual illustration of the exchange of portions of the complete master mapping layer and the complete update mapping layer maintained in non-volatile memory between the mapping table cache of the volatile memory (RAM) and non-volatile memory.

Referring to FIG. 7, the concept of swapping of portions of the mLayer 500 and uLayer 600, in the form of select copies of the mSets 502 and uSets 602 between the non-volatile memory 104 and the limited size mapping table cache 119 of the RAM 116 is shown. The non-volatile memory 104 of the NVM system 100 may include a common pool of non-volatile memory blocks 700 in which the mLayer 500 and uLayer 600 control data (uSets and mSets) may be written and intermixed. As discussed herein, when a uSet 602 or mSet 502 in RAM is consolidated to update the uLayer or mLayer in non-volatile memory, the blocks in the common pool of blocks 700 containing one or both of uLayer and mLayer data may all be treated in the same manner for garbage collection purposes. For example, if the common pool of mapping blocks 700 is running out of free space and a garbage collection trigger is reached, a block with the least amount of valid data may be selected, the valid data may be moved to a relocation block in the common pool 700 regardless of whether it is uSet or mSet data, and the original block erased to create a free block for later use in storing one or both of uSets or mSets.

Another aspect of the mSet and uSet structure described above, where the physical space allotted to each mSet 502 and uSet 602 is the same, but the LBA range for each is much smaller than for each uSet 602, is that the mapping table management module 112 of the controller 102 may manage the uSets and mSets uniformly. The mapping table management module may place uSets and mSets in the same mapping table cache of RAM 116 and mix both mSet and uSet data in the same blocks in non-volatile memory 104. Accordingly, the mapping table management module 112 may manage the uSets 602 and mSets 502 uniformly in the non-volatile memory 104, including during garbage collection where valid data for each may share the same source blocks and the same destination blocks.

Figure 8:
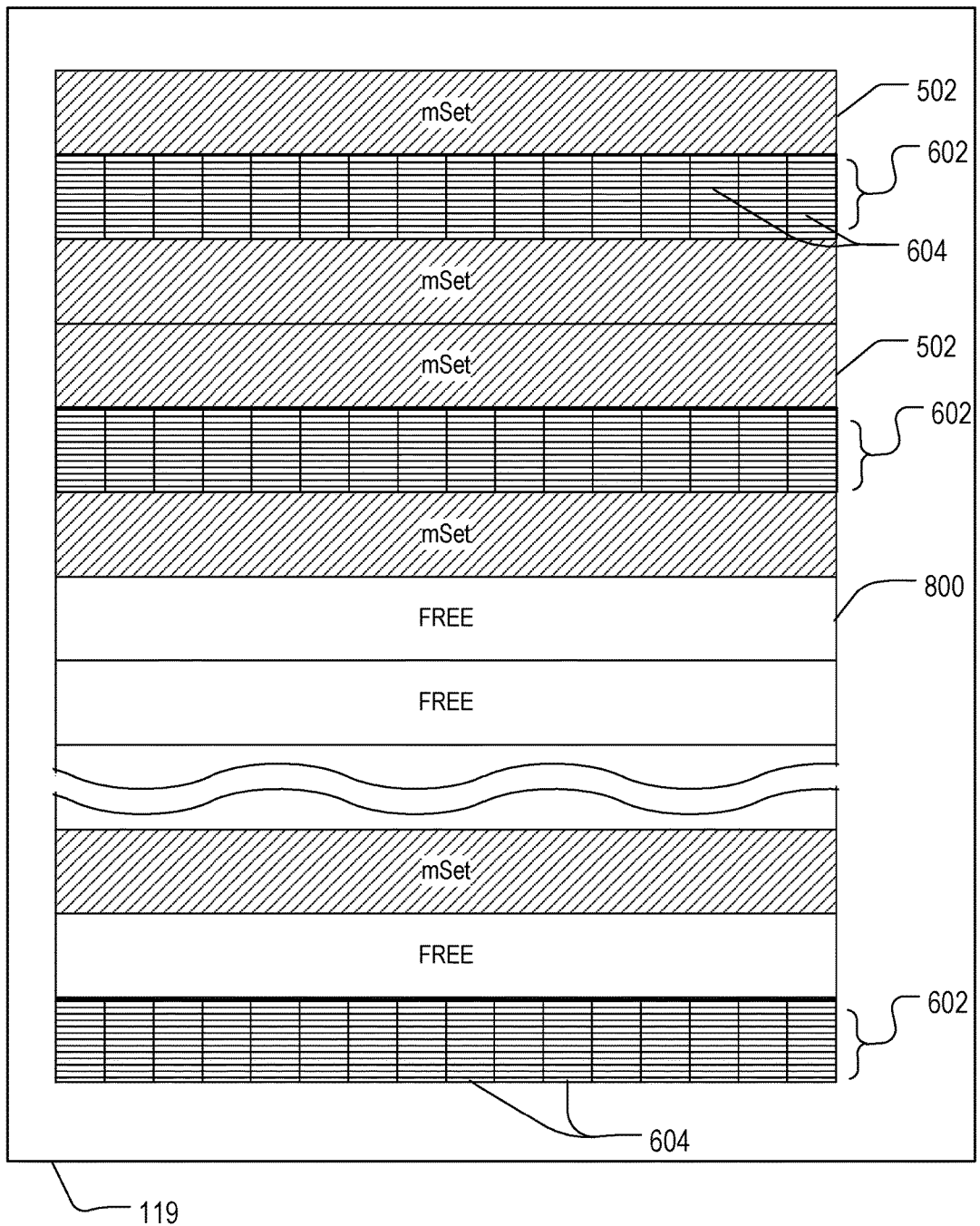
FIG. 8 illustrates an expanded view of the mapping table cache of the volatile memory (RAM) showing the use of the RAM as a common pool of the master mapping layer portions (mSets) and update mapping layer portions (uSets).

FIG. 8 illustrates a conceptual view of the common memory pool of selected mSets 502 and uSets 602 that share the limited size mapping table cache 119 of the RAM 116. Simply by way of example, and to better illustrate one scale of LBA coverage difference between the mSets and uSets, the uSets 602 are shown as divided into regions 604, in this case 16 regions, where each region is dedicated to a limited number of entries for updates to a respective mSet. Accordingly, as noted previously, an mSet 502 can handle all changes to LBA mappings in the fixed LBA range exclusively assigned to that mSet, but a uSet 602 allows for handling updates in many more LBA ranges (in this example, 16 times as many LBA ranges as an mSet), but can only handle a certain number of LBA updates in each LBA range before those updates need to be consolidated into the appropriate mSet 502 due to the same physical size allotted for each mSet 502 and the uSet 602. The relative size of the mSets to uSets may be any of a number LBA ratios to suit particular memory design needs, and the 16:1 ratio noted above is simply one example, but that ration is then fixed in one implementation. The mapping table index 123 tracks the location of any mSet 502 or uSet 602 currently in the mapping table cache 119 to the location of the version of that mSet or uSet in non-volatile memory 104. In different implementations, the mapping table index 123 may be a single index with individual entries for each mapping layer, or it may be divided into separate indices for each mapping layer. For example the mapping table index 123 may include a mLayer index and a separate uLayer index. For implementations noted below where more than two mapping layers are utilized, a single mapping table index or separate mapping table indices scaled to the appropriate number of mapping layers present may be implemented.

The number of mapping table data, also referred to as control data, reads and writes from non-volatile memory 104 that are needed for a given host command is generally known as write amplification. With the fixed size mapping table cache 119 in RAM 116 that is less than the uLayer 600 size, there are instances when uSets and mSets will need to be swapped out of the mapping table cache so that the correct uSet 602 or mSet 502 that corresponds to the LBAs for the current host command is in RAM 116. Accordingly, not only will uSets be swapped into and out of RAM 116, but some thought as to which of the uSets or mSets should be selected to potentially reduce the number of control data reads and writes from non-volatile memory may be necessary. For read commands, both the mSet and the uSet corresponding to the LBAs in the command are typically needed in the mapping table cache 119 to be sure the most up-to-date mapping address is found. For write commands, the mapping table management module 112 may be configured to select the uSet from non-volatile memory corresponding to the LBA in the command rather than the mSet corresponding to the LBA in the command to swap into the mapping table cache. In this manner, a wider range of LBA updates may be managed in the RAM 116 without needing to frequently swap in and out multiple mSets.

Figure 9:
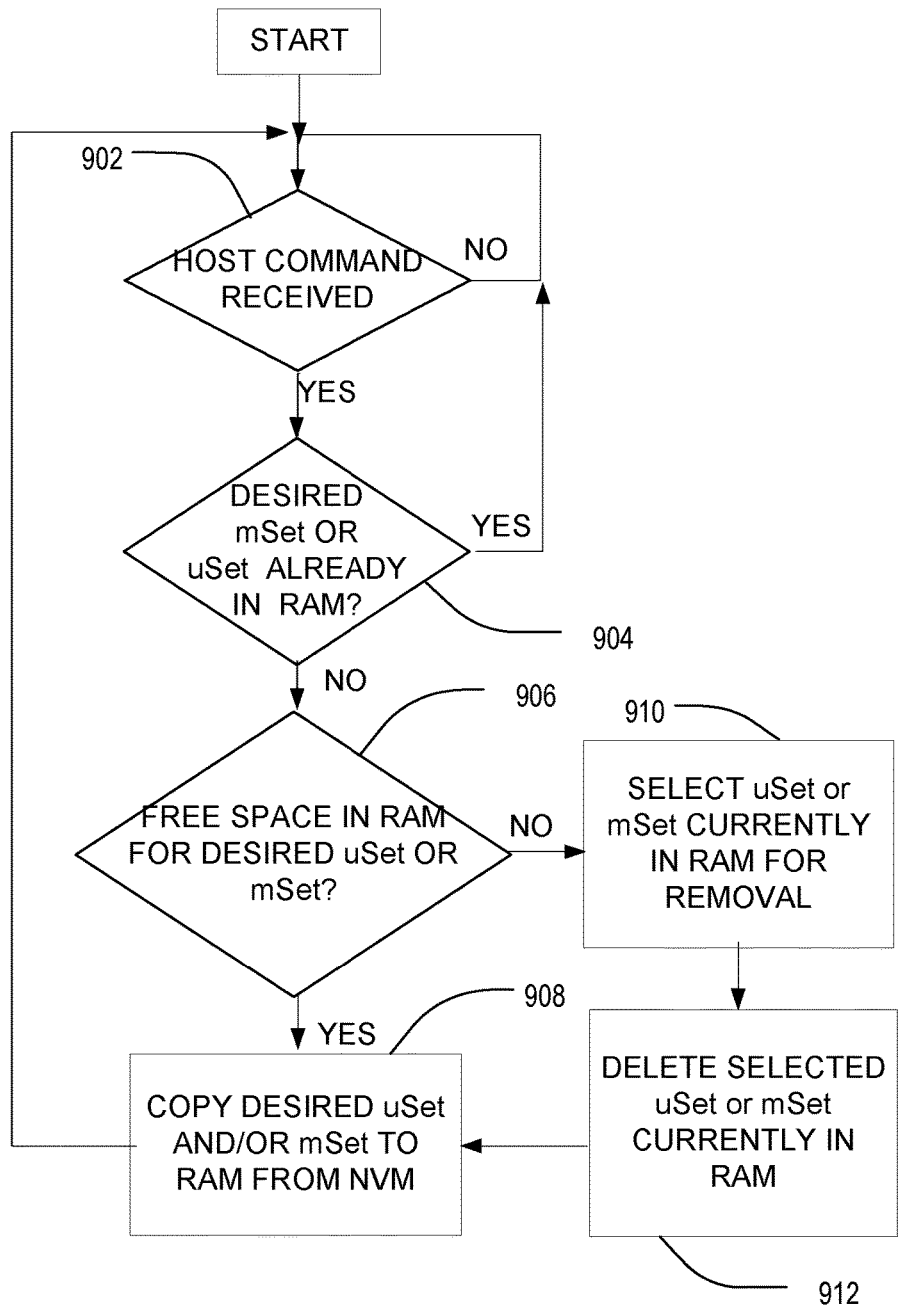
FIG. 9 is a flow diagram illustrating an embodiment of the uSet and mSet selection process for a limited mapping table area in volatile memory.

FIG. 9 illustrates one example control data flow that may be implemented to handle a low RAM system where uSets 602 may need to be swapped into and out of RAM 116.

When a host command is received (at 902), the mapping table management module 112 of the controller 102 may determine if the uSet 602 or mSet 502 needed for that command is already in RAM 116 (at 904). If so, the controller 102 may then utilize that mSet 502 or uSet 602 as necessary for the command. For example, if the host command is a read command, the controller 102 first looks to see if the mSet 502 corresponding to the LBA in the read command is present. If the mSet 502 is not in RAM 116, then the corresponding uSet 602 is looked for in RAM 116 and used, if found, for data lookup in non-volatile memory 104. If neither of the mSet 502 or uSet 602 for the LBA identified in that read command is present in RAM 116 (at 904), then the controller 102 will retrieve both the mSet 502 and the uSet 602 corresponding to the LBA from the complete uLayer or mLayer in non-volatile memory 104 when there is space available in the mapping table cache 119 of RAM 116 (at 906, 908). However, due to the limited size of the mapping table cache 119 of the RAM 116, if there is not enough free space for the needed uSet 602 and mSet 502 (at 906), then one or more of the uSets or mSets currently in the mapping table cache 119 must be swapped out.

Swapping out mSets or uSets currently stored in the mapping table cache 119 includes first selecting an mSet 502 or uSet 602 for removal (at 910). Selection of which uSet 602 or mSet 502 is to be swapped out may be based on any of a number of different criteria, alone or in combination. In one implementation, the least recently accessed mSet 502 or uSet 602 in the mapping table cache 119 of RAM 116, which has had no changes made to it since it was copied to RAM 116, may be selected because that uSet 602 or mSet 502 may simply be deleted without writing any data to non-volatile memory 104. If no mSet or uSet currently in the mapping table cache 119 is free of updates since it was last copied into the RAM 116, then the mSet or uSet with the least number of updates may be selected for swapping out. Alternatively, the least recently used uSet or mSet in the cache 119 may be selected, or some other different criteria alone or in other combinations may be implemented to select the mSet or uSet to be removed.

When the uSet 602 or mSet 502 selected for removal from RAM 116 has had updates made to it since it was previously retrieved from non-volatile memory 104, that uSet 602 or mSet 502 is written to non-volatile memory 104 to bring the uLayer 600 or mLayer 500, respectively, up-to-date. The selected control data (mSet 502 or uSet 602) is then deleted from its location in the mapping table cache 119 of RAM 116 (at 912) and the desired uSet 602 or mSet 502 is copied into the newly available space in the mapping table cache 119 from the complete uLayer 600 or mLayer 500 in non-volatile memory 104.

When the received host command is a write command (at 902), the process of checking the RAM 116 is similar. First, the controller looks to see if the relevant mSet 502 is already in the mapping table cache 119 and that mSet 502 is updated in RAM to indicate the new logical to physical mapping for the received data. Alternatively, if the mSet 502 is not found in RAM 116, then the relevant uSet 602 is looked for in RAM 116 and updated if found. If neither the mSet 502 nor the uSet 602 is currently in RAM 116, then either of the mSet 502 or the uSet 602 may be copied from non-volatile memory 104 into RAM if there is enough free space in the mapping table cache 119 of RAM 116 (at 906, 908) and the copied uSet 602 or mSet 502 updated in RAM with the new mapping information for the write. Similarly, as with the read operation described above, if there is no space left in the mapping table cache of the RAM 116, then an existing mSet 502 or uSet 602 is selected as noted above for swapping out of RAM 116 and writing updates into the uLayer or mLayer in non-volatile memory 104. The desired uSet 602 or mSet 502 may then be copied into the available space created by the uSet 602 or mSet 502 swapped of RAM 116.

The example of FIGS. 1-9, has discussed a system and method for managing master mapping table and update mapping table data in a system having a low amount of RAM assigned to hold mapping table data relative to the size of the full update mapping table for the NVM system 100. The mLayer and uLayer are broken up into fixed size portions (mSets and uSets) where the physical size of mSets is the same as uSets and the LBA ranges of uSets and mSets are static, such that uSets and mSets are swapped into and out of the limited space of the mapping table cache of RAM based on need. The need for a particular uSet 602 or mSet 502 in RAM 116 is based on the LBAs associated with host commands, for example read or write commands. The type of workload that the NVM system has, where workload refers to the amount of sequential LBAs, random LBAs, or mix of sequential and random LBA requirements may also affect which type of mapping data, uSet or mSet, is kept in the limited size mapping table cache 119 of RAM 116.

For example, in one implementation it may be advantageous to keep more uSets in RAM 116 than mSets when the workload is sequential because the regions 604 of the uSet 602 are less likely to overflow and need consolidation and the wider LBA range coverage of the uSet 602 would be advantageous over the narrower mSet 502 ranges, thus if the host provides hints that the workflow will be sequential, the mapping table management module 112 may keep more uSets 602 in the mapping table cache 119 in RAM 116. For example, assuming that each mSet 502 and uSet 602 is 32 kilobytes (Kbytes) of mapping data, where each mSet 502 has 32 Kbytes of sequential logical and physical address pairings for a fixed LBA range, and each uSet 602 has 16 regions 604 of 2 Kbytes for mapping triplets (LBA start 608, PBA start 610 and length 612) where each region LBA range is the same as a mSet LBA range, long sequential runs in a wide LBA arrangement would be easier to handle in uSets. The uSets would have enough update space in their regions 604 in this example to avoid the rapid updating and swapping that the narrower LBA ranges of the mSets might require.

With respect to updating address information in uSets, until all of the update entries 606 of a region 604 have been written to, more address updates may be written into that region. When update activity to a particular LBA range covered by any region 604 is high and the region overflows, where the update entries 606 are all full for that region 604, then a consolidation process is triggered to consolidate the valid address updates from the mapping table cache 119 to non-volatile memory 104. The most recent update for each LBA that has updates recorded must be consolidated. The consolidation process may be triggered when any region 604 in the uSet 602 overflows. If the mSet corresponding to that region 604 is not already in the mapping table cache 119, it is copied from non-volatile memory 104 into the cache 119, updated with the most recent updates from the region 604 and then the mSet is written back to non-volatile memory 104. The region 604 of the uSet 602 is then erased in RAM. Whenever an entry 504 of an mSet 502 has been update the mapping table cache 119, that mSet is written to non-volatile memory 104.

Variable uSET

In the above example, a static LBA range is assigned to the uSets, for example the 16:1 range difference in the example noted above for uSet LBA range versus mSet LBA range coverage, where each uSet 602 has 16 regions 604 and each region 604 corresponds exclusively to a unique mSet 502. Because update entries 606 in regions 604 of each uSet 602 track starting LBA and corresponding PBA, as well as a length of the run of data that starts at that LBA/PBA, uSets may be an efficient way of handling contiguous range workloads at the NVM system 100. The longer the contiguous range for a write command and associated address update, the more efficient the uLayer 600 can be. For workloads that include long contiguous ranges of LBA addresses in each write, the corresponding region 604 in the appropriate uSet 602 may only need a small amount of the allotted physical mapping space and thus the uSet 602 may have a significant amount unused space.

In an alternative embodiment to the fixed LBA range uSets 602 discussed previously, adaptive size uSets are contemplated, where the LBA range may vary but the physical size taken up by the adaptive uSet remains fixed. Although it is contemplated that the adaptive uSet would be generated to compress the LBA ranges of multiple uSets 602 into a physical size allotted for one typical uSet 602 (which is still the same as the size of each mSet 502 in this implementation), it is also contemplated that a single uSet 602 may be split into multiple uSets having a lesser LBA range that the original uSet in certain circumstances.

Figure 10:
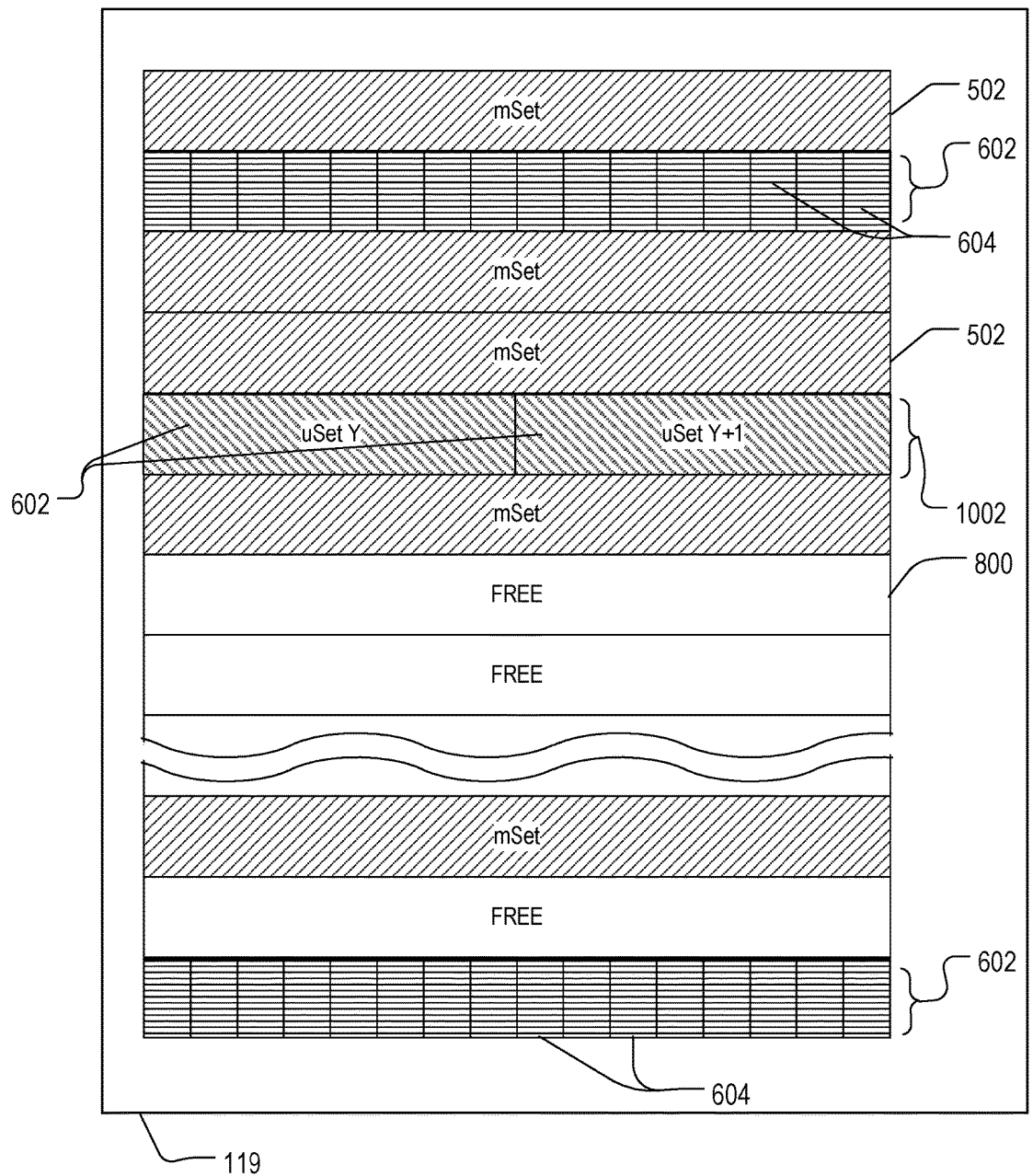
FIG. 10 illustrates an alternative mapping table cache of FIG. 8 having an adaptive uSet entry combined from multiple standard uSet entries.

As illustrated in FIG. 10, an adaptive uSet 1002 is shown. The adaptive uSet 1002 in this example is shown as two contiguous LBA range uSets 602 (uSet Y and uSet Y+1) that now occupy the physical space of one uSet 602. In order to concatenate the two uSet ranges into a single adaptive uSet 1002 and keep the total LBA range coverage equal to two uSets, the number of update entries 606 in the regions 604 of each of uSet Y and uSet Y+1 may be reduced by half. For example, if each uSet 602 is 32 kbyte in size, and the base uSet to mSet LBA range is 16:1, then the adaptive uSet 1002 with two base uSet LBA ranges in FIG. 10 would have a 32:1 LBA range as compared to the mSet 502 LBA range, but placed into the same 32 kbyte data set size each uSet and mSet are limited to in the fixed-size mapping cache 119 of RAM 116. The data set size is the same for each uSet, adaptive uSet, and mSet to permit swapping into and out of the RAM 116 and shared blocks of non-volatile memory 104 and common treatment of the data sets in non-volatile memory 104. The above-stated size of 32 Kbytes for each data set is simply one example, and the NVM system 100 may utilize a different fixed data set size shared by all of the uSets and mSets in other implementations.

In embodiments where more than two uSets 602 are aggregated into an adaptive uSet 1002, the reduction of the number of update entries may be proportional to the number of contiguous LBA range uSets being combined. Also, as illustrated in FIG. 10, regular uSets 602 and adaptive uSets 1002 may both exist in the mapping table cache 119 of RAM 116 based on current workload needs. Additionally, when an adaptive uSet 1002 experiences an overflow in a region due to the number of updates exceeding the number of available update entries 606 in the region 604, the adaptive uSet 1002 is maintained and written into non-volatile memory in the same manner as a standard uSet. When that adaptive uSet 1002 is then later retrieved, the adaptive uSet 1002 is kept intact until the controller determines that the LBA range should be further increased or decreased based on the fullness of the adaptive uSet 1002 or other uSet consolidation or separation criteria.

Figure 11:
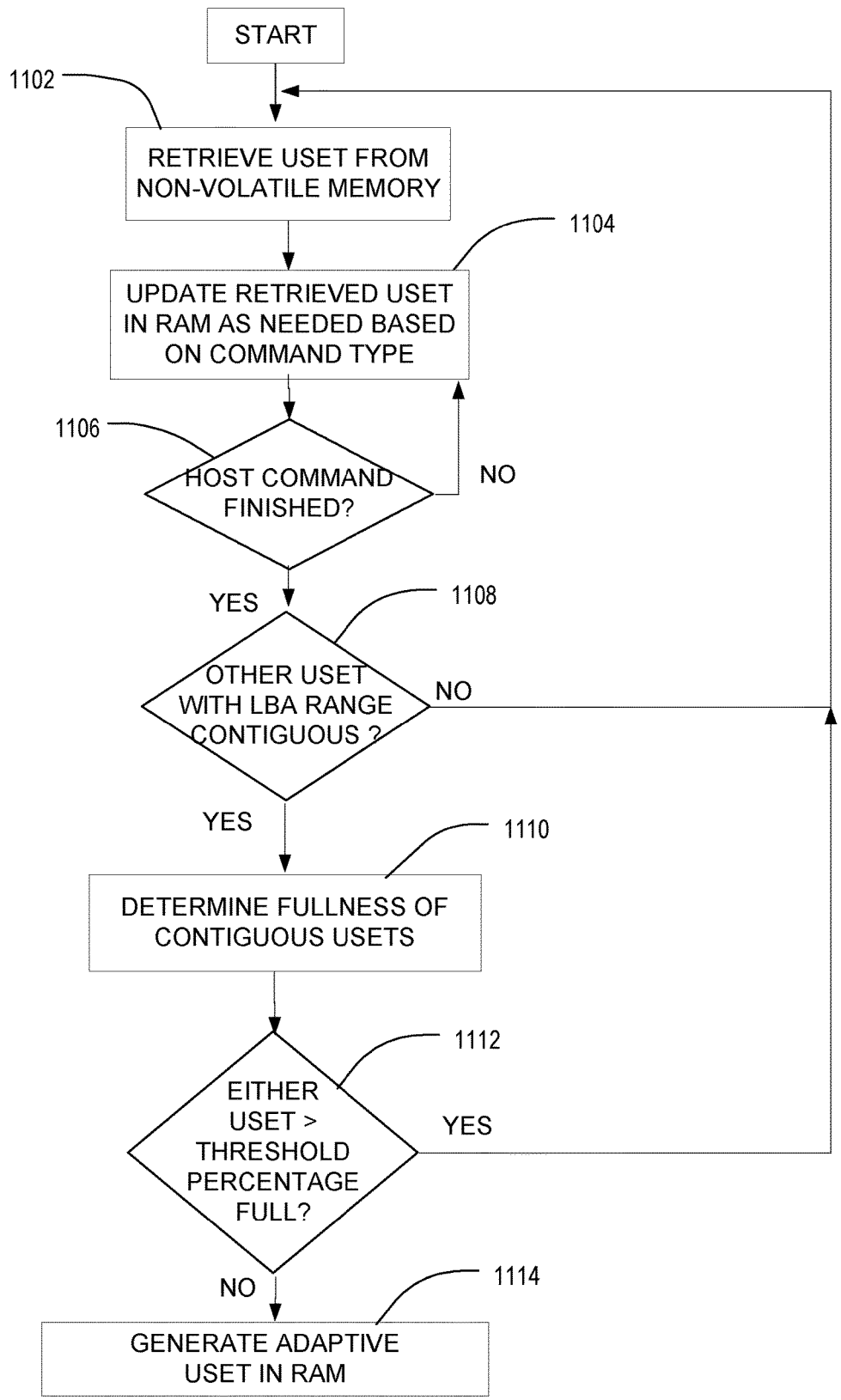
FIG. 11 is an flow chart of an example method of generating adaptive uSets from individual uSets.

As shown in FIG. 11, one method for initiating creation of an adaptive uSet 1002 with a higher LBA range is described. When the NVM system 100 is configured for generating adaptive uSets 1002, rather than having only fixed size uSets 602, an adaptive uSet 1002 may be generated in certain circumstances. When a uSet 602 is retrieved from non-volatile memory 104 and written to RAM 116 (at 1102), the uSet 602 will be updated with new mapping updates in the mapping cache 119 of RAM 116 when the host command is a write command, but will only be accessed without update for a read command (at 1104). When the host command is finished with the uSet 602 (at 1106), the controller 102 may then determine if any other uSets 602 are present in the RAM 116 that have a LBA range that is contiguous with the beginning or end of the LBA range of the recently retrieved uSet 602 (at 1108). If so, the controller 102 determines the fullness of the contiguous uSets, for example by scanning each region 604 of the uSets 602 in the cache 119 with contiguous LBA ranges to see what percentage of each region is already filled with updates (at 1110).

When the fullness of each region in each of the uSets 602 is less than a predetermined threshold, for example when every region 604 of the uSets 602 is 25% or less full with update data, then the mapping table management module 112 of the controller may generate an adaptive uSet 1002 that combines the mapping updates of the two contiguous LBA ranges of the separate uSets 602 into a single adaptive uSet that occupies a same physical space as a single uSet 602 (at 1112, 1114). In this example, where the threshold of 25% or less fullness per region 604 is used to permit combining of uSets 602, the adaptive uSet 1002 that is created will then start out with regions that are no more than 50% full because the region size is reduced by half in the adaptive uSet 1002. For example, assuming each uSet 602 is 32 Kbytes in size and has 16 regions (each corresponding to an LBA range of a different 1 of 16 contiguous mSets) and each region in a uSet is assigned 2 Kbytes of space, then if two such uSets are combined into a single adaptive uSet 1002 which must fit into the same 32 Kbyte data size, each resulting region is compressed into 1 Kbyte. Thus if 25% or less of the entries in the original 2 Kbyte regions were full prior to combining, then that same region in the resulting adaptive uSet 1002 would be half the physical size and thus twice the fullness of the original uSet 602.

The 25% or less region fullness threshold is just one example of a threshold that would still provide room to add more entries to a region 604 in the resulting adaptive uSet 1002 before the adaptive uSet region overflows and requires consolidation into the non-volatile memory 104. Other thresholds for permitting combination of uSets 602, or further combination of adaptive uSets with other uSets 602 or adaptive uSets 1002 are contemplated that may be higher or lower than 25% in other implementations. In alternative implementations, the region fullness threshold may be a threshold applied to the average region fullness calculated for all regions 604 in a uSet 602 rather than requiring every region 604 of the uSet 602 to individually have a fullness at or below the threshold. In yet other alternative embodiments, instead of maintaining the same total number of regions 604 of separate uSets in the resulting adaptive uSet, where twice as many regions would exist but each with half the physical space allotted as compared with the original uSets, the adaptive uSet 1002 may instead be generated with the same discrete number of regions as in a regular uSet, but with each region being reassigned to twice the LBA range of the original. For example, this latter alternative would take two contiguous LBA regions of 2 Kbyte each, where region 1 covered LBA updates for LBAs 1-100 and region 2 covered updates for LBAs 101-200, and create a new combined region of 2 Kbyte that now covers LBAs 1-200 in the resulting adaptive uSet 1002.

The use of adaptive uSets 1002 can free up a location in the mapping table cache 119 for another uSet 602 (or adaptive uSet 1002) or mSet 502 without first needing to swap out or consolidate any current uSet or mSet data into non-volatile memory and remove that current uSet 602 or mSet 502 from RAM 116. Further consolidation of additional contiguous uSets into an existing adaptive uSet 1002 in RAM 116 may be achieved using the process of FIG. 11. The consolidation of uSets with sequential LBA ranges that meet a fullness requirement, and the consolidation of only whole numbers of uSets into adaptive uSets 1002 is illustrated in the implementation of FIG. 11, however combining non-sequential LBA range uSets 602 or combining less than all of a uSet with another uSet 602 is contemplated in other embodiments.

In cases where an adaptive uSet 1002 has regions 604 that overflow too often, for example more than a predetermined threshold number of overflows in regions a given adaptive uSet 1002, then the controller 102 may split the adaptive uSet 1002 apart into its constituent uSets 602, or smaller LBA range adaptive uSets 1002. In doing so, another uSet or mSet would need to first be swapped out of the mapping table cache 119 to make room for the two pieces of the former adaptive uSet 1002. In one alternative implementation, when a first threshold number of overflows is reached in the adaptive uSet 1002, rather than immediately splitting up the adaptive uSet 1002 the controller may first try to resolve the overflows by scanning the overflow region(s) and performing a fine resolution deletion in RAM 116 to remove obsolete update entries 606 in those region(s) 604 in RAM to create space for new update entries 606 to be stored in that region 604. In this alternative implementation of addressing a threshold number of region 604 overflows in an adaptive uSet, a second threshold number of overflows may then be used to decide when fine resolution deletion of obsolete update entries is no longer suitable and the adaptive uSet will be split up into smaller LBA range adaptive uSets 1002 or constituent uSets 602.

More Than Two Mapping Layers

Figure 12:
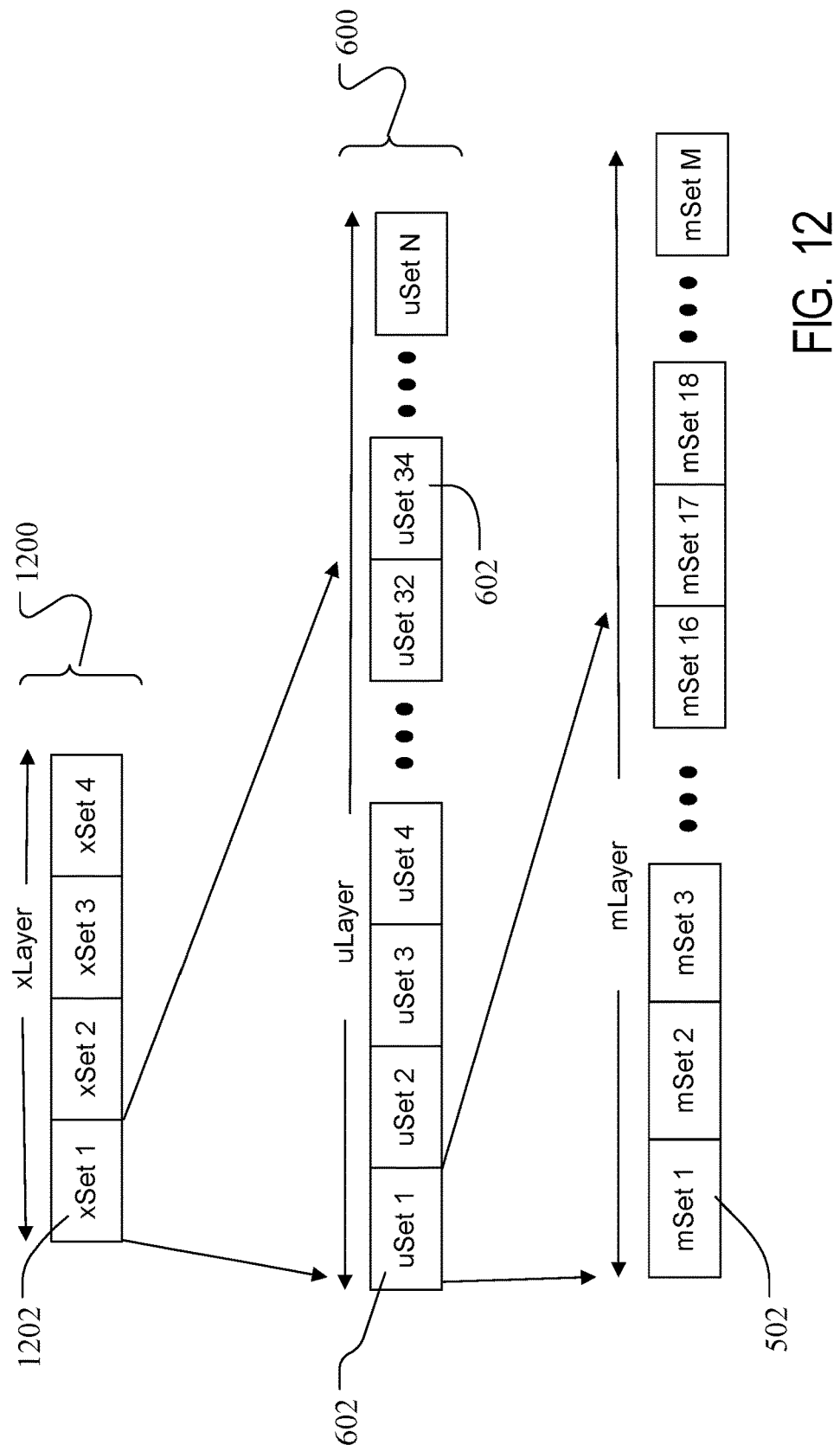
FIG. 12 illustrates a three mapping layer architecture having a highly compressed extended mapping layer (xLayer) in addition to the mLayer and uLayer of FIGS. 5 and 6.

Instead of having two mapping tables of the mLayer 500 and uLayer 600 that are broken up into same physical size portions, mSets and uSets, each having respective fixed LBA ranges, or where the uSet may have a variable LBA range, it is also contemplated that the NVM system 100 may instead be configured to utilize three or more mapping layers. In a three mapping layer implementation, the mLayer 500 and uLayer 600 of the prior implementations may be supplemented by an expanded mapping layer (xLayer) that includes one or more portions designated xSets. Referring to FIG. 12, each xSet 1202 in the xLayer 1200 may be the same physical size as each mSet 502 and each uSet 602, but may cover a unique fixed LBA range that is greater than the LBA range for a uSet 602, for example each xSet LBA range may include 32 uSet LBA ranges. The representation of the three mapping layers in FIG. 12 is meant to show that the LBA range coverage of each xSet 1202 is a fixed whole number of sequential uSet LBA ranges, and that the LBA range of each uSet is a fixed whole number of sequential mSet ranges. The number of entries in each of a xSet 1202 and uSet 602 will be less than the total number of LBAs in each of their respective LBA range coverages based on the fact that the physical size of the xSet and uSet is fixed while the LBA range for which mapping updates may be stored is increased. The uSet 602 and mSet 502 structures and configurations may be the same as described previously.

In this implementation, each of the different xSet 1202, uSet 602 and mSet 502 LBA ranges may be fixed and the physical size for each xSet, uSet and mSet is equal. Accordingly, the equal size xSets 1202, uSets 602 and mSets 502 may be uniformly handled in the non-volatile memory 104 by sharing the same common pool of memory blocks and being treated together during garbage collection operations in non-volatile memory. Valid xSets, uSets and mSets may be copied from the same or different source blocks in non-volatile memory 104 and written into the same update block in non-volatile memory 104.

Figure 13:
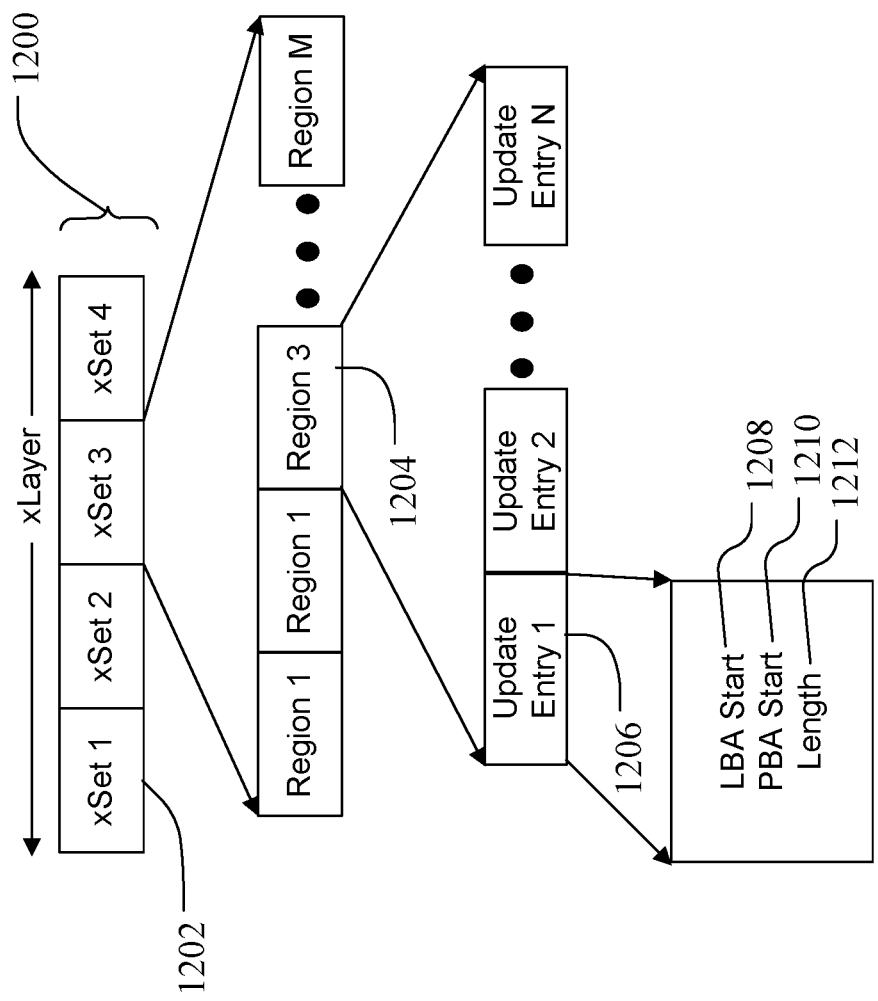
FIG. 13 illustrates an expanded mapping layer of updates to logical-to-physical address mappings for the non-volatile memory system.

Referring to FIG. 13, the xLayer 1200 is a mapping structure that is smaller in size than the uLayer 600 or mLayer 500 and its structure is similar to that of the uLayer 600. The xLayer 1200 is divided into uniform size portions, or xSets 1202, that each include a fixed number of regions 1204. In the example of FIG. 13, the xLayer 1200 is shown with 4 xSets merely to conform with the example of FIG. 12, however the number of xSets 1202 may be any predetermined number in other implementations. Each of the fixed regions 1204 is assigned exclusively to receive updates for a predetermined uSet 602 LBA range (see FIG. 12) and thus an xSet 1202 includes address update space assigned for a plurality of contiguous uSets. Each region 1204 of an xSet 1202 includes a fixed number of update entries 1206, where each update entry may include a LBA starting address 1208, a PBA starting address 1210 and a data length 1212 for the run of data starting at the LBA and PBA starting addresses 1208, 1210.

Although a region 1204 in an xSet 1202 corresponds to an LBA range of a particular uSet 602, the limited number of update entries 1206 in each region 1204 means that there is only enough room in each region to hold N update entries for the associated LBA range. When all the limited number of update entries 1206 for a particular region 1204 have been filled due to write activity since the last uLayer update, the presently stored mapping updates in any full regions 1204 of that xSet 1202 are consolidated with the uSets 602 corresponding to those regions 1204. In this manner the latest updates from the update entries 1206 are emptied into the uLayer 600 so that those regions 1204 of the xSet 1202 are erased and again available for more address updates. Then, when the uSets 602 have a region that overflows (where all the available entries 606 in a uSet region 604 are full) that uSet region 604 may be consolidated with the corresponding mSet 502 as described above. For implementations with more than 3 layers, this process may be scaled to accommodate the number of different additional layers utilized. Also, it is contemplated that, in some alternative implementations, that consolidation may be made directly from xSet region 1204 to a corresponding mSet without the intermediate step of first consolidating from xSet region 1204 to corresponding uSet 602 and then from uSet 602 to mSet 502.

Figure 14:
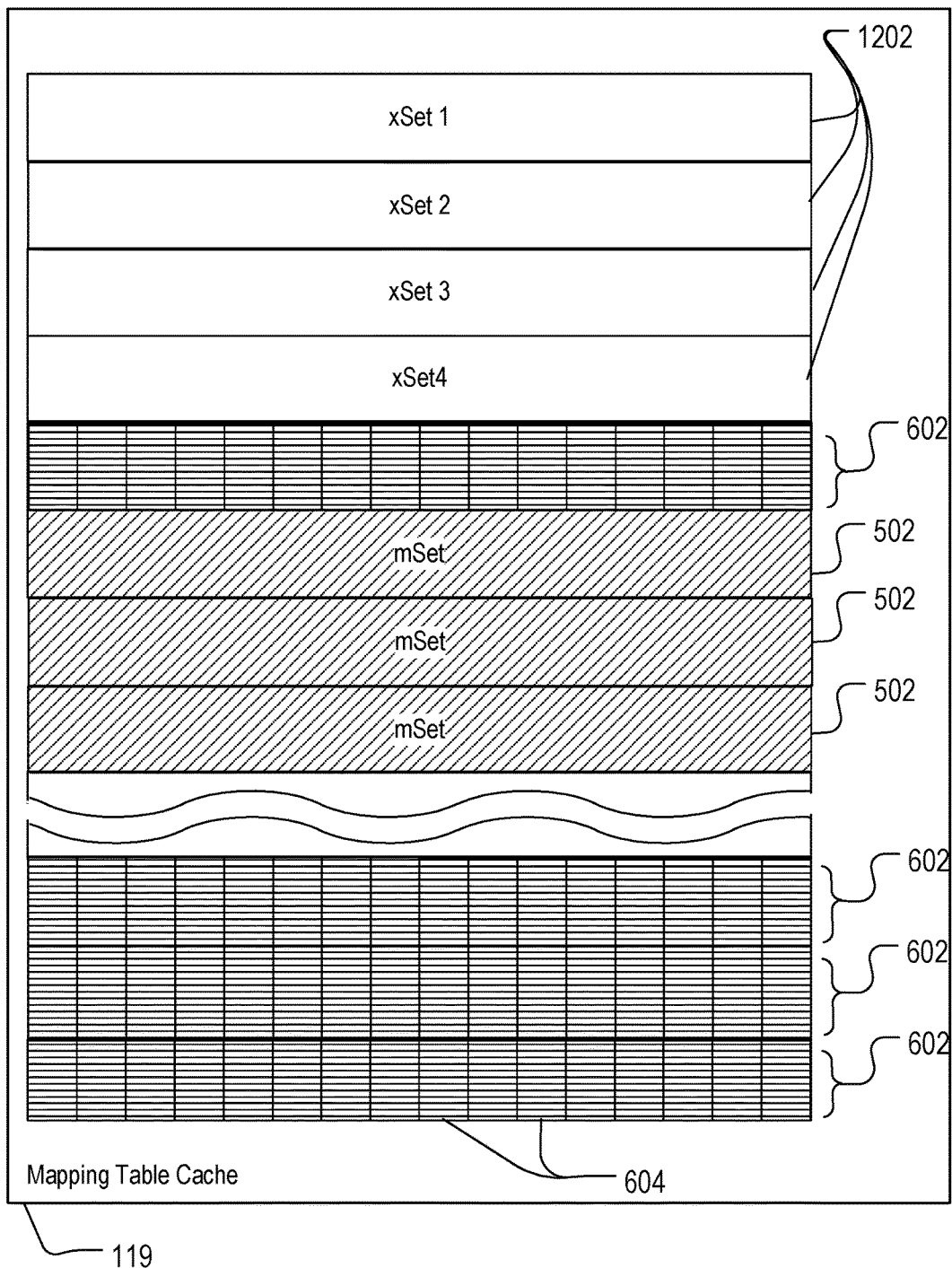
FIG. 14 illustrates an alternative mapping table cache of FIG. 8 showing the use of the RAM as a common pool of the a limited number of expanded mapping layer portions (xSets), master mapping layer portions (mSets) and update mapping layer portions (uSets).

As shown in FIG. 14, the xSets 1202 may be swapped into and out of the mapping table cache of RAM 116 in any proportion in accordance with current and historical workload for the NVM system 100. Thus, xSets 1202, uSets 602 and mSets 502 may be handled uniformly in the RAM 116 as well as the non-volatile memory 104. The xSets 1202 may contribute to avoiding large amounts of consolidations due to mapping updates. For example, each region of the xSet may be consolidated to a uSet when the xSet update space overflows, followed by an update to the mSet from the uSet when the uSet region 604 overflows. Alternatively, the xSet 1202 updates may be directly consolidated with the relevant mSets 502.

It is contemplated that all xSets 1202 for the xLayer 1200, covering the entire LBA range of the NVM system 100, may simultaneously be present in the mapping portion 119 of the RAM 116 if needed. An example of this is shown in FIGS. 12 and 14, where a copy of the four xSets 1202 making up the entire xLayer 1200 in this particular example are shown as being in four of the RAM entries in the mapping cache 119 of RAM 116. If, as shown in FIG. 12, there are a total of four xSets 1202 in the xLayer 1200, then all of the xSets 1202 would take up only four RAM locations and the remaining locations in the mapping portion may contain uSets and/or mSets relevant to the current workload of the NVM system 100. Although all xSets 1202 in the xLayer 1200 may fit into the mapping table cache 119, the workload presented to the NVM system 100 by a host will likely more often be such that not all xSets 1202 will be present at one time in the mapping table cache 119.

Referring to FIG. 15, a different mix of xSets 1202, uSets 602 and mSets 502 in the mapping table cache 119 in RAM is shown. In this example, which may be at a different point in time than the example of FIG. 14, 2 xSets 1202 are shown rather than all xSets. Also, for ease of illustration, arrows from regions of an xSet 1202 to corresponding uSets 602 are shown. Similarly, arrows from regions 604 of uSets 602 with corresponding mSets 502 are shown. At the hypothetical snapshot in time represented by FIG. 15, there are several mSets 502 and one xSet 1202 in the mapping table cache 119 that do not have a corresponding uSet. Also, the concept of select xSets, uSets and mSets being swapped between non-volatile memory 104 and the mapping table cache 119 is shown. The entire xLayer, uLayer and mLayer is maintained in non-volatile memory 104 in the same fashion as was discussed before with respect to the two layer version of FIG. 7.

The component mSets 502, uSets 602 and xSets 1202 of each layer 500, 600, 1200 shown in FIG. 15 all share the same pool of non-volatile memory blocks 700 and may be mixed in the same non-volatile memory blocks 700. Accordingly, although the various xSets, uSets and mSets in their respective xLayer, uLayer and mLayer are shown as segregated in non-volatile memory 104 simply by way of example in FIG. 15, the individual xSets, uSets and mSets may be mixed together in a given non-volatile memory block in the pool of mapping blocks 700 in one implementation. It is contemplated that the controller 102 may retrieve xSets, uSets and mSets in parallel from the non-volatile memory 104. The xSets 1202 provide an even broader range of LBA coverage in the mapping table cache 119 of RAM 116 and avoid the need to swap smaller range uSets or mSets when the workload from the host is mainly long sequential writes over a wide LBA range that would require multiple different uSets associated with each of the widely dispersed LBAs implicated by the workload.

Each of the different implementations above for managing mapping table data (control data) in a low-RAM non-volatile memory: the two-layer mLayer and uLayer mapping data with fixed physical size and respective fixed LBA range mSets and uSets, the two-layer version with adaptive LBA range uSets, and the three layer (xLayer, uLayer and mLayer) version, may be implemented exclusively of one another in different NVM systems 100. In other words, it is contemplated that the particular single version of handling mapping data may be predetermined at the time of manufacture of the NVM system 100. Also, the relative LBA ranges included in each xSet, uSet or mSet may be scaled according to the particular application and memory size of the NVM system and are not limited to the 16:1 mSet to uSet ranges, or the 32:1 uSet to xSet ranges that were provided merely by way of example in the discussion above (for non-adaptive uSet implementations). Also, with respect to the make-up of xSets, uSets and mSets (or other intermediate mapping layers that may be implemented in other embodiments) that are occupying the mapping table cache 119 at any given time, the workload may lead to different ratios of xSets, uSets and mSets being present.

Workload, as referred to herein, relates to the various read and write commands received from a host at any particular time. A workload of read commands will result in sets from all layers corresponding to the particular LBAs in the read command being copied into the mapping table cache 119. A host write command that is sequential, where the LBAs in received commands are contiguous and relatively closely spaced such that fewer update entries in uSets (or xSets depending on the number of mapping layers being used) are required and no consolidation is required will allow the higher LBA density sets (uSets and xSets) to remain in the mapping table cache. Write commands that are random, where non-contiguous LBAs or LBAs that are widely dispersed across the address range, will lead to more mSets being required in the mapping table cache 119 as uSets or xSets may be more likely to be swapped out or have regions overflow and require consolidation that brings in mSets for update and writing into non-volatile memory. In one implementation, the mapping table management module 112 of the controller 102 is biased to select uSets 602 (or higher LBA compression layer sets such as xSets 1202) to reduce the frequency of swapping and consolidation.

The utilization of swappable portions of multiple mapping layers may address a challenge faced in low RAM non-volatile memories. Additionally, with the different logical spans and same physical sizes of mSets, uSets and xSets, even RAM rich memory devices may adopt the techniques and structures discussed above. The different logical span mapping layers may provide a way to reduce large numbers of consolidations and frequencies of swaps into and out of the mapping table cache. Greater numbers of layers, such as the three layer version noted above may be used to assist with uSet/mSet consolidation with relatively wide random write (or random Trim) workloads. A tradeoff may exist in performance and write amplification for very large capacity non-volatile memory devices with having more than three mapping layers to obtain a diversity of LBA capacity mapping sets usable in the mapping table cache. The use of multiple mapping layers with interchangeable sets of a same physical size may allow a more flexible ability for a NVM system to balance the amount of the different mapping layers in RAM in response to various workloads that may arise.

the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three-dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional exemplary structures described but cover all relevant memory structures within the spirit and scope of the invention as described herein and as understood by one of skill in the art.

Methods and systems have been disclosed for implementing a non-volatile memory system having a low RAM configurations where a limited availability of mapping table cache space in RAM prevents maintaining a complete update mapping table in RAM. The system may include a complete master mapping table and update mapping table in non-volatile memory and a processor with a mapping table management module that is configured to swap in and out subsets of the master mapping table and of the update mapping table from the limited RAM space based on host command workload. The subsets of the main mapping table and the update mapping table may have the identical physical size, but different LBA range coverage. The LBA range coverage of the main mapping table subsets and update table mapping subsets may be predetermined fixed LBA ranges or, in an alternative embodiment, the update mapping table subsets may be adaptive to different LBA ranges.

Also, in yet another implementation, more than two mapping table layers may be utilized where subsets of each mapping layer may have fixed LBA coverage ranges that increase in each layer. For example a three layer mapping implementation may include the main mapping table and update mapping table layers described above, but adds a third mapping layer referred to as the expanded mapping table layer that includes subsets with a much wider LBA coverage than the update mapping table subsets, but having a same physical size. Depending on NVM system workload, different ones of the subsets of the different mapping layers are saved as a cached version of the mapping table information in volatile memory.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A non-volatile memory system comprising:
a non-volatile memory;
a volatile memory having a fixed-size mapping table cache; and
a controller in communication with the volatile memory and the non-volatile memory, the controller configured to:
store a master mapping table of logical to physical address mapping data for data in the non-volatile memory, the master mapping table having a predetermined size and divided into a plurality of master mapping table sets;
store, in the non-volatile memory, an update mapping table of logical to physical address mapping data, the update mapping table having updated logical to physical mapping data not yet written into the master mapping table, the update mapping table divided into a plurality of update mapping table sets each having a same physical size as a master mapping table set, wherein a size of the fixed-size mapping table cache of the volatile memory is less than a size of the update mapping table; and
swap a portion of the update mapping table sets between the non-volatile memory and the volatile memory based on a workload of the non-volatile memory system.

2. The non-volatile memory system of claim 1, wherein in response to receiving a host command relating to a logical block address (LBA), the controller is configured to:
determine if the LBA associated with the host command is in any master mapping table set or update mapping table set currently in the volatile memory; and
when the LBA is not found in any master mapping table set or update mapping table set currently in the volatile memory:
retrieve a master mapping table set corresponding to the LBA and an update mapping table set corresponding to the LBA from the non-volatile memory; and store the master mapping table set and the update mapping table set corresponding to the LBA in the volatile memory.

3. The non-volatile memory system of claim 2, wherein the controller is further configured to, when there is insufficient free space available in the mapping table cache of the volatile memory to store a master mapping table set or update mapping table set corresponding to the LBA associated with the host command, select one or more master mapping table sets or update mapping table sets to remove from the volatile memory prior to loading the master mapping table set or updated mapping table set associated with the LBA.

4. The non-volatile memory system of claim 3, wherein to select one or more master mapping table sets or update mapping table sets to remove from the volatile memory the controller is configured to: select a master mapping table set having a greatest number of updates since last being retrieved from the non-volatile memory; and update the master mapping table in the non-volatile memory with all updates in the selected master mapping table set.

5. The non-volatile memory system of claim 1, wherein in response to receiving a write request relating to a logical block address (LBA), the controller is further configured to:
when a master mapping table set associated with the LBA is already stored in the volatile memory, update in the volatile memory the master mapping table set associated with the LBA.

6. The non-volatile memory system of claim 5, wherein when the master mapping table set associated with the LBA is not already stored in the volatile memory, the controller is further configured to:
when an update mapping table set associated with the LBA is already stored in the volatile memory, update in the volatile memory the update mapping table set associated with the LBA.

7. The non-volatile memory system of claim 5, wherein when neither a master mapping table set associated with the LBA nor an update mapping table set associated with the LBA is already stored in the volatile memory, the controller is configured to:
load a master mapping table set and an update mapping table set corresponding to the LBA into the volatile memory from the non-volatile memory; and
update the master mapping table set and update mapping table set for associated with the LBA in the volatile memory.

8. The non-volatile memory system of claim 1, wherein the non-volatile memory comprises a substrate formed with a three-dimensional memory structure.

9. A non-volatile memory system comprising:
a non-volatile memory;
a volatile memory having a fixed-size mapping table cache; and
a controller in communication with volatile memory and the non-volatile memory, the controller configured to:
store a master mapping table of logical to physical address mapping data for data in the non-volatile memory, the master mapping table having a predetermined size and divided into a plurality of master mapping table sets;
store, in the non-volatile memory, an update mapping table of logical to physical address mapping data, the update mapping table having updated logical to physical mapping data not yet written into the master mapping table, the update mapping table divided into a plurality of update mapping table sets each having a same physical size as a master mapping table set, wherein a size of the fixed-size mapping table cache of the volatile memory is less than a size of the update mapping table; and swap a portion of the update mapping table sets between the non-volatile memory and the volatile memory based on a workload of the non-volatile memory system, wherein each of the plurality of master mapping table sets has a same physical size and a same range length of logical block addresses (LBAs); and wherein each of the plurality of update mapping table sets has a same physical size as each of the plurality of master mapping table sets, but has a greater range length of LBAs than each of the master mapping table sets.

10. The non-volatile memory system of claim 9, wherein each master mapping layer set comprises a direct access mapping of sequentially numbered logical block addresses to any physical block addresses associated with each of the sequentially numbered LBAs.

11. The non-volatile memory system of claim 10, wherein each update mapping table set comprises a plurality of regions, where each region is exclusively associated with a sequential LBA range of a different master mapping table set, and where each of the plurality of regions of each update mapping table set is configured to store only a limited number of mapping update entries.

12. The non-volatile memory system of claim 11, wherein each update entry is configured to receive a LBA start address, a physical block address (PBA) start address and a data length for a contiguous run of data associated with the LBA start address.

13. The non-volatile memory system of claim 9, wherein each of the plurality of update mapping sets comprises a first fixed range length of LBAs that is an integer multiple of the range length of LBAs in each of the master mapping table sets.

14. The non-volatile memory system of claim 9, wherein the controller is further configured to, in response to detecting a merger criteria:

merge a first update mapping set in the mapping table cache associated with a first LBA range and a second update mapping set in the mapping table cache associated with a second LBA range into an adaptive update mapping set;

wherein the merger criteria comprise the first LBA range being sequential to the second LBA range and the first and second update mapping sets each having less than a threshold fullness.

15. A method of managing mapping data in a non-volatile memory system, the non-volatile memory system having a non-volatile memory and a controller in communication with the non-volatile memory, the method comprising the controller:

receiving a host command, the host command identifying at least one logical block address (LBA) assigned to data associated with the command;

determining if mapping data associated with the at least one LBA is present in a fixed-size mapping cache in volatile memory of the non-volatile memory system, wherein a size of the fixed-size mapping cache of the volatile memory is less than a size of an update mapping layer in the non-volatile memory;

when the mapping data associated with the at least one LBA is not present in the volatile memory mapping cache and the fixed-size volatile memory mapping cache is full, the controller:

removing an update mapping layer set currently stored in the volatile memory not associated with the at least one LBA, the update mapping layer set comprising one of a plurality of update mapping layer sets forming a complete update mapping layer stored in the non-volatile memory;

copying any valid update data from the removed update mapping layer set into non-volatile memory;

copying into the fixed-size mapping cache from the non-volatile memory at least one of a master mapping layer set or an update mapping layer set associated with the at least one LBA; and wherein the non-volatile memory contains a master mapping layer divided into a plurality of master mapping layer sets, each master mapping layer set containing direct mapping entries of logical-to-physical mappings for all logical addresses in a first range length of LBAs, and contains an update mapping layer divided into a plurality of update mapping layer sets each having mapping update entries for a second range length of LBAs.

16. The method of claim 15, wherein removing the update mapping layer set comprises selecting one of a plurality of update mapping layer sets already stored in the volatile memory having a highest number of updates since last being copied from the non-volatile memory.

17. The method of claim 15, wherein removing the update mapping layer set comprises selecting one of a plurality of update mapping layer sets already stored in the volatile memory having no updates since last being copied from the non-volatile memory and discarding the selected one of the plurality of update mapping layer sets from the volatile memory.

18. The method of claim 15, wherein copying at least one of a master mapping layer set or an update mapping layer set into the volatile memory from the non-volatile memory further comprises:

when the host command is a write command associated with host data having sequential LBAs, copying an update mapping layer set from the non-volatile memory corresponding to the sequential LBAs into the volatile memory without copying any master mapping layer sets corresponding to the sequential LBAs.

19. The method of claim 18, wherein the plurality of master mapping layer sets and the plurality of update mapping layer sets in the non-volatile memory share a common pool of non-volatile memory blocks such that at least one of the plurality of master mapping layer sets is stored in a same non-volatile memory block as at least one of the plurality of update mapping layer sets.

20. The method of claim 19, wherein removing the update mapping layer set already stored in the volatile memory comprises copying the update mapping layer set already stored in the volatile memory to a block having both update mapping layer sets and master mapping layer sets in the common pool of non-volatile memory blocks.

21. A non-volatile memory system comprising:

a non-volatile memory having a master mapping layer divided into a plurality of master mapping sets of logical-to-physical mapping entries, an update mapping layer divided into a plurality of update mapping sets and an expanded mapping layer divided into a plurality of expanded mapping layer sets;

wherein each master mapping set, update mapping set and expanded mapping set has a same physical size, and wherein each update mapping set is associated with a logical block address (LBA) range equal to a fixed plurality of master mapping set LBA ranges and each expanded mapping set is associated with a fixed plurality of update mapping set LBA ranges;

a volatile memory mapping cache having a fixed size that is less than a size of the update mapping layer;

mapping set management means for, when mapping data for an LBA associated with a received host command is not in the volatile memory mapping cache:

copying at least one master mapping set, update mapping set or expanded mapping set for the LBA associated with a received host command from the non-volatile memory to the volatile memory mapping cache when space is available in the volatile memory mapping cache for additional mapping data; and when the volatile memory mapping cache is currently full, removing at least one master mapping set, update mapping set or expanded mapping set that is currently in the volatile memory mapping cache and then copying at least one master mapping set, update mapping set or expanded mapping set for the LBA.

\* \* \* \* \*